United States Patent
Lee

(10) Patent No.: US 10,728,572 B2
(45) Date of Patent: Jul. 28, 2020

(54) METHOD AND APPARATUS FOR PROCESSING VIDEO SIGNAL BY USING IMPROVED OPTICAL FLOW MOTION VECTOR

(71) Applicant: LG ELECTRONICS INC., Seoul (KR)

(72) Inventor: Jaeho Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/332,203

(22) PCT Filed: Sep. 11, 2017

(86) PCT No.: PCT/KR2017/009935
§ 371 (c)(1),
(2) Date: Mar. 11, 2019

(87) PCT Pub. No.: WO2018/048265
PCT Pub. Date: Mar. 15, 2018

(65) Prior Publication Data
US 2019/0238880 A1    Aug. 1, 2019

Related U.S. Application Data

(60) Provisional application No. 62/393,076, filed on Sep. 11, 2016.

(51) Int. Cl.
*H04N 19/513* (2014.01)
*H04N 19/176* (2014.01)
(Continued)

(52) U.S. Cl.
CPC ......... *H04N 19/513* (2014.11); *H04N 19/119* (2014.11); *H04N 19/147* (2014.11);
(Continued)

(58) Field of Classification Search
CPC .. H04N 19/119; H04N 19/513; H04N 19/176; H04N 19/573; H04N 19/147; H04N 19/44; H04N 19/577
See application file for complete search history.

(56) References Cited

U.S. PATENT DOCUMENTS

2017/0084007 A1\* 3/2017 Rakhshanfar ............ H04N 5/21
2018/0249172 A1\* 8/2018 Chen ....................... H04N 19/54

FOREIGN PATENT DOCUMENTS

EP    3364655 A1 \*  8/2018  ........... H04N 19/105
JP    2015-139062 A    7/2015
(Continued)

OTHER PUBLICATIONS

Alshin et al., "Coding efficiency improvements beyond HEVC with known tools", Proc. SPIE 9599, Applications of Digital Image Processing XXXVIII, 95991C, Sep. 22, 2015, pp. 1-15. (Year: 2015).\*

(Continued)

*Primary Examiner* — Reza Aghevli
(74) *Attorney, Agent, or Firm* — Dentons US LLP

(57) ABSTRACT

The present invention provides a method for decoding a video signal on the basis of an optical flow motion vector, comprising the steps of: when a bi-directional prediction is performed for a current block, acquiring a gradient map corresponding to the current block, wherein the gradient map represents a set of gradients at all pixel positions within a block having a larger size than the current block, and each gradient includes an X-axis gradient component and a Y-axis gradient component; determining an optical flow motion vector by applying a weight factor to the X-axis gradient component and the Y-axis gradient component; acquiring an
(Continued)

optical flow predictor on the basis of the optical flow motion vector; and reconstructing the video signal by using the optical flow predictor.

9 Claims, 10 Drawing Sheets

(51) Int. Cl.
  *H04N 19/119* (2014.01)
  *H04N 19/573* (2014.01)
  *H04N 19/147* (2014.01)
  *H04N 19/577* (2014.01)
(52) U.S. Cl.
  CPC ......... *H04N 19/176* (2014.11); *H04N 19/573* (2014.11); *H04N 19/577* (2014.11)

(56) References Cited

FOREIGN PATENT DOCUMENTS

| KR | 10-2011-0112240 A | 10/2011 | |
| KR | 20110112240 A * | 10/2011 | ........... H04N 19/182 |
| KR | 10-2015-0100355 A | 9/2015 | |
| KR | 20150100355 A * | 9/2015 | ............. H04N 19/51 |
| KR | 10-1590876 B1 | 2/2016 | |
| KR | 10-1656091 B1 | 9/2016 | |
| WO | WO-2017082698 A1 * | 5/2017 | ........... H04N 19/105 |

OTHER PUBLICATIONS

Alshina et al., "Bi-directional optical flow for future video codec", IEEE 2016 Data Compression Conference, Mar. 30-Apr. 1, 2016, pp. 83-90. (Year: 2016).*

* cited by examiner (a)

(b)

(a)

(b)

(a)

(b)

METHOD AND APPARATUS FOR PROCESSING VIDEO SIGNAL BY USING IMPROVED OPTICAL FLOW MOTION VECTOR

CROSS-REFERENCE TO RELATED APPLICATIONS

This application is the National Stage filing under 35 U.S.C. 371 of International Application No. PCT/KR2017/009935, filed on Sep. 11, 2017, which claims the benefit of U.S. Provisional Applications No. 62/393,076, filed on Sep. 11, 2016, the contents of which are all hereby incorporated by reference herein in their entirety.

TECHNICAL FIELD

The present invention relates to a method and apparatus for encoding/decoding a video signal and, more particularly, to a method of performing inter coding using an improved optical flow motion vector when generalized bi-prediction is performed.

BACKGROUND ART

Compression encoding means a series of signal processing technology for transmitting digitalized information through a communication line or for storing digitalized information in a form appropriate to a storage medium. Media such video, an image, and a voice may be a target of compression encoding, particularly, technology that performs compression encoding using video as a target is referred to as video compression.

Next generation video contents will have a characteristic of a high spatial resolution, a high frame rate, and high dimensionality of scene representation. In order to process such contents, memory storage, memory access rate, and processing power technologies will remarkably increase Therefore, it is necessary to design a coding tool for more efficiently processing next generation video contents.

DISCLOSURE

Technical Problem

The present invention proposes a method of encoding, decoding a video signal more efficiently.

Furthermore, the present invention provides a method of improving a predictor using an optical flow.

Furthermore, the present invention provides a method of improving a predictor using an optical flow in generalized bi-prediction.

Furthermore, the present invention provides a method of improving a predictor using an adaptive weight factor in generalized bi-prediction.

Technical Solution

In order to accomplish the objects, the present invention provides a method of performing bi-directional prediction by applying a weight to the gradient component of an optical flow predictor.

Furthermore, the present invention provides a method of improving a predictor using an adaptive weight factor in generalized bi-prediction.

Furthermore, the present invention provides a method of improving a predictor using an optical flow in generalized bi-prediction.

Advantageous Effects

The present invention can improve compression performance of a video by incorporating motion information of a pixel unit into prediction without the transmission of an additional motion vector by applying an optical flow.

Furthermore, the present invention can obtain a further improved predictor using an adaptive weight factor in generalized bi-prediction.

Furthermore, the present invention can obtain an improved predictor and improve compression performance of a video by performing bi-directional prediction by applying a weight to the gradient component of an optical flow predictor.

DESCRIPTION OF DRAWINGS

FIG. 8 is a flowchart illustrating a method of performing optical flow motion compensation through bi-directional prediction, and FIG. 9 is a diagram for illustrating a method of determining a gradient map.

BEST MODE

Figure 1:
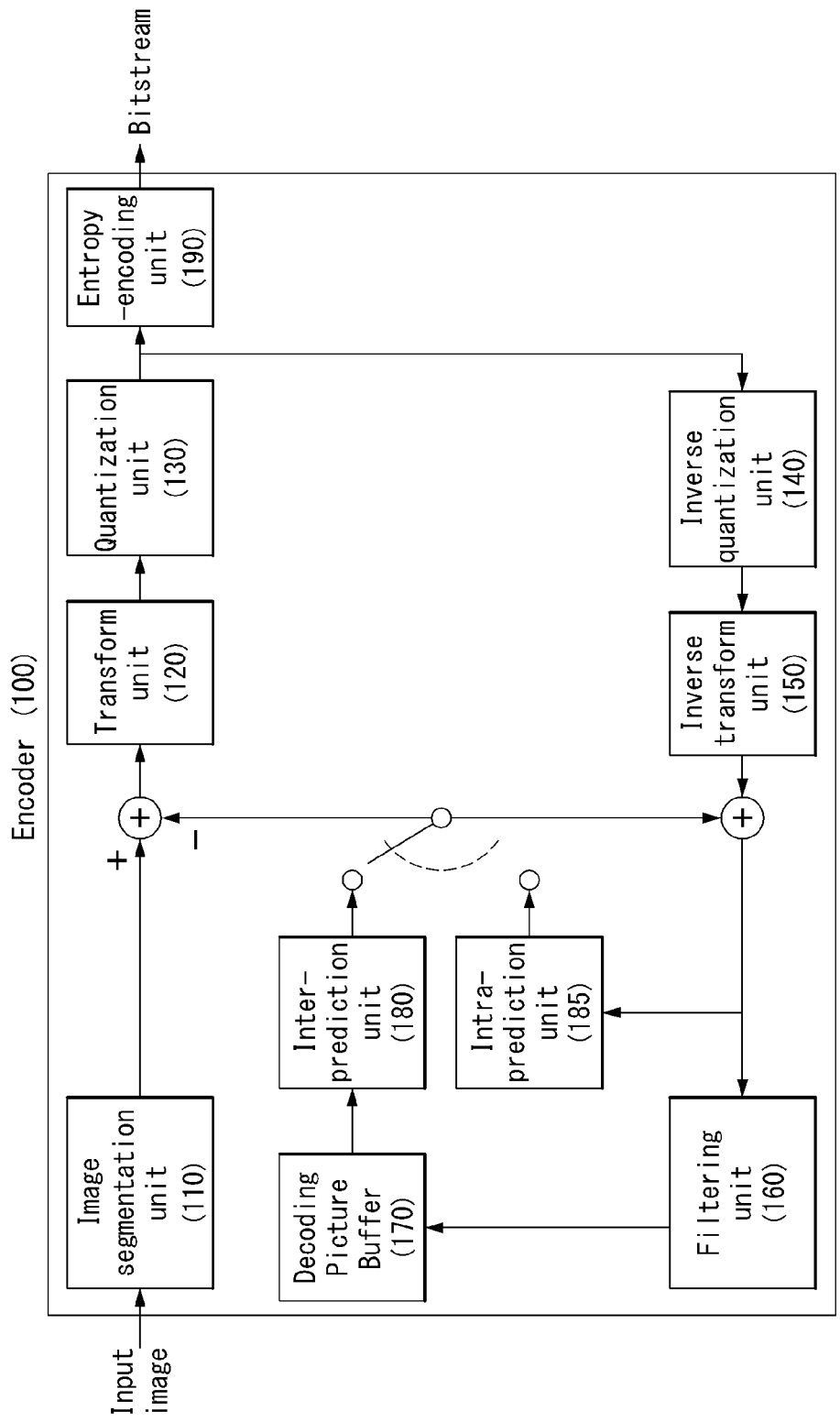
FIG. 1 is a block diagram illustrating a configuration of an encoder for encoding a video signal according to an embodiment of the present invention.

The present invention provides a method of decoding a video signal based on an optical flow motion vector, including obtaining a gradient map corresponding to a current block when a bi-directional prediction is performed on the current block, wherein the gradient map includes a set of gradients at all pixel positions within a block having a size more extended than the current block and includes an x-axis gradient component and a y-axis gradient component, determining an optical flow motion vector by applying a weight factor to the x-axis gradient component and the y-axis gradient component, obtaining an optical flow predictor based on the optical flow motion vector, and reconstructing the video signal using the optical flow predictor.

In the present invention, the method further includes checking whether the bi-directional prediction is performed on the current block. The bi-directional prediction is performed using a first reference picture and a second reference picture in opposite direction on a time axis with reference to the current block.

In the present invention, the weight factor includes at least one of an L0 predictor weight, an L1 predictor weight, an L0 x-axis gradient weight, an L1 x-axis gradient weight, an L0 y-axis gradient weight or an L1 y-axis gradient weight.

In the present invention, the L0 predictor weight, the L0 x-axis gradient weight and the L0 y-axis gradient weight are set as a first value. The L1 predictor weight, the L1 x-axis gradient weight and the L1 y-axis gradient weight are set as a second value. The sum of the first value and the second value is 1.

In the present invention, the optical flow predictor is obtained based on the bi-directional predictor. The bi-directional predictor indicates a prediction value generated from a first reference picture and a second reference picture based on a motion vector of the current block, and an L0 predictor weight and an L1 predictor weight are applied to the bi-directional predictor.

In the present invention, determining the optical flow motion vector further includes obtaining an x-axis optical flow motion vector or a y-axis optical flow motion vector and comparing the x-axis optical flow motion vector or the y-axis optical flow motion vector with a preset threshold. The optical flow motion vector is determined based on a result of the comparison.

In the present invention, when the x-axis optical flow motion vector or the y-axis optical flow motion vector is greater than the preset threshold, the x-axis optical flow motion vector or the y-axis optical flow motion vector is determined as the preset threshold.

In the present invention, when the x-axis optical flow motion vector or the y-axis optical flow motion vector is not greater than the preset threshold, the x-axis optical flow motion vector or the y-axis optical flow motion vector is determined as the obtained x-axis optical flow motion vector or y-axis optical flow motion vector.

The present invention provides an apparatus for decoding a video signal based on an optical flow motion vector, including an inter prediction unit configured to obtain a gradient map corresponding to a current block when a bi-directional prediction is performed on the current block, determine an optical flow motion vector by applying a weight factor to the x-axis gradient component and the y-axis gradient component, and obtain an optical flow predictor based on the optical flow motion vector and a reconstruction unit configured to reconstruct the video signal using the optical flow predictor. The gradient map includes a set of gradients at all pixel positions within a block having a size more extended than the current block and includes the x-axis gradient component and the y-axis gradient component.

In the present invention, the inter prediction unit is configured to check whether the bi-directional prediction is performed on the current block. The bi-directional prediction is performed using a first reference picture and a second reference picture in opposite directions on a time axis with reference to the current block.

[Mode for Invention]

Hereinafter, a configuration and operation of an embodiment of the present invention will be described in detail with reference to the accompanying drawings, a configuration and operation of the present invention described with reference to the drawings are described as an embodiment, and the scope, a core configuration, and operation of the present invention are not limited thereto.

Further, terms used in the present invention are selected from currently widely used general terms, but in a specific case, randomly selected terms by an applicant are used. In such a case, in a detailed description of a corresponding portion, because a meaning thereof is clearly described, the terms should not be simply construed with only a name of terms used in a description of the present invention and a meaning of the corresponding term should be comprehended and construed.

Further, when there is a general term selected for describing the invention or another term having a similar meaning, terms used in the present invention may be replaced for more appropriate interpretation. For example, in each coding process, a signal, data, a sample, a picture, a frame, and a block may be appropriately replaced and construed. Further, in each coding process, partitioning, decomposition, splitting, and division may be appropriately replaced and construed.

FIG. 1 shows a schematic block diagram of an encoder for encoding a video signal, in accordance with one embodiment of the present invention.

Referring to FIG. 1, an encoder 100 may include an image segmentation unit 110, a transform unit 120, a quantization unit 130, an inverse quantization unit 140, an inverse transform unit 150, a filtering unit 160, a DPB (Decoded Picture Buffer) 170, an inter-prediction unit 180, an intra-prediction unit 185 and an entropy-encoding unit 190.

The image segmentation unit 110 may divide an input image (or, a picture, a frame) input to the encoder 100 into one or more process units. For example, the process unit may be a coding tree unit (CTU), a coding unit (CU), a prediction unit (PU), or a transform unit (TU).

However, the terms are used only for convenience of illustration of the present disclosure, the present invention is not limited to the definitions of the terms. In this specification, for convenience of illustration, the term "coding unit" is employed as a unit used in a process of encoding or decoding a video signal, however, the present invention is not limited thereto, another process unit may be appropriately selected based on contents of the present disclosure.

The encoder 100 may generate a residual signal by subtracting a prediction signal output from the inter-prediction unit 180 or intra prediction unit 185 from the input image signal. The generated residual signal may be transmitted to the transform unit 120.

The transform unit 120 may apply a transform technique to the residual signal to produce a transform coefficient. The transform process may be applied to a pixel block having the same size of a square, or to a block of a variable size other than a square.

The quantization unit 130 may quantize the transform coefficient and transmits the quantized coefficient to the entropy-encoding unit 190. The entropy-encoding unit 190 may entropy-code the quantized signal and then output the entropy-coded signal as bit streams.

The quantized signal output from the quantization unit 130 may be used to generate a prediction signal. For example, the quantized signal may be subjected to an inverse quantization and an inverse transform via the inverse quantization unit 140 and the inverse transform unit 150 in the loop respectively to reconstruct a residual signal. The reconstructed residual signal may be added to the prediction signal output from the inter-prediction unit 180 or intra-prediction unit 185 to generate a reconstructed signal.

Meanwhile, in the compression process, adjacent blocks may be quantized by different quantization parameters, so that deterioration of the block boundary may occur. This phenomenon is called blocking artifacts. This is one of important factors for evaluating image quality. A filtering process may be performed to reduce such deterioration. Using the filtering process, the blocking deterioration may be eliminated, and, at the same time, an error of a current picture may be reduced, thereby improving the image quality.

The filtering unit 160 may apply filtering to the reconstructed signal and then outputs the filtered reconstructed signal to a reproducing device or the decoded picture buffer 170. The filtered signal transmitted to the decoded picture buffer 170 may be used as a reference picture in the inter-prediction unit 180. In this way, using the filtered picture as the reference picture in the inter-picture prediction mode, not only the picture quality but also the coding efficiency may be improved.

The decoded picture buffer 170 may store the filtered picture for use as the reference picture in the inter-prediction unit 180.

The inter-prediction unit 180 may perform temporal prediction and/or spatial prediction with reference to the reconstructed picture to remove temporal redundancy and/or spatial redundancy. In this case, the reference picture used for the prediction may be a transformed signal obtained via the quantization and inverse quantization on a block basis in the previous encoding/decoding. Thus, this may result in blocking artifacts or ringing artifacts.

Accordingly, in order to solve the performance degradation due to the discontinuity or quantization of the signal, the inter-prediction unit 180 may interpolate signals between pixels on a subpixel basis using a low-pass filter. In this case, the subpixel may mean a virtual pixel generated by applying an interpolation filter. An integer pixel means an actual pixel existing in the reconstructed picture. The interpolation method may include linear interpolation, bi-linear interpolation and Wiener filter, etc.

The interpolation filter is applied to a reconstructed picture and can improve the precision of prediction. For example, the inter prediction unit 180 may generate an interpolated pixel by applying the interpolation filter to an integer pixel, and may perform prediction using an interpolated block configured with interpolated pixels as a prediction block.

In an embodiment of the present invention, the inter prediction unit 180 can improve a predictor using an optical flow in generalized bi-prediction.

In another embodiment of the present invention, the inter prediction unit 180 may obtain a further improved predictor using an adaptive weight factor in generalized bi-prediction.

In another embodiment of the present invention, the inter prediction unit 180 may obtain an improved predictor by performing bi-directional prediction by applying a weight to the gradient component of an optical flow predictor.

The intra prediction unit 185 may predict a current block with reference to samples peripheral to a block to be now encoded. The intra prediction unit 185 may perform the following process in order to perform intra prediction. First, the intra prediction unit 185 may prepare a reference sample necessary to generate a prediction signal. Furthermore, the intra prediction unit 185 may generate a prediction signal using the prepared reference sample. Thereafter, the intra prediction unit 185 codes a prediction mode. In this case, the reference sample may be prepared through reference sample padding and/or reference sample filtering. The reference sample may include a quantization error because a prediction and reconstruction process has been performed on the reference sample. Accordingly, in order to reduce such an error, a reference sample filtering process may be performed on each prediction mode used for intra prediction.

The prediction signal generated through the inter prediction unit 180 or the intra prediction unit 185 may be used to generate a reconstructed signal or to generate a residual signal.

Figure 2:
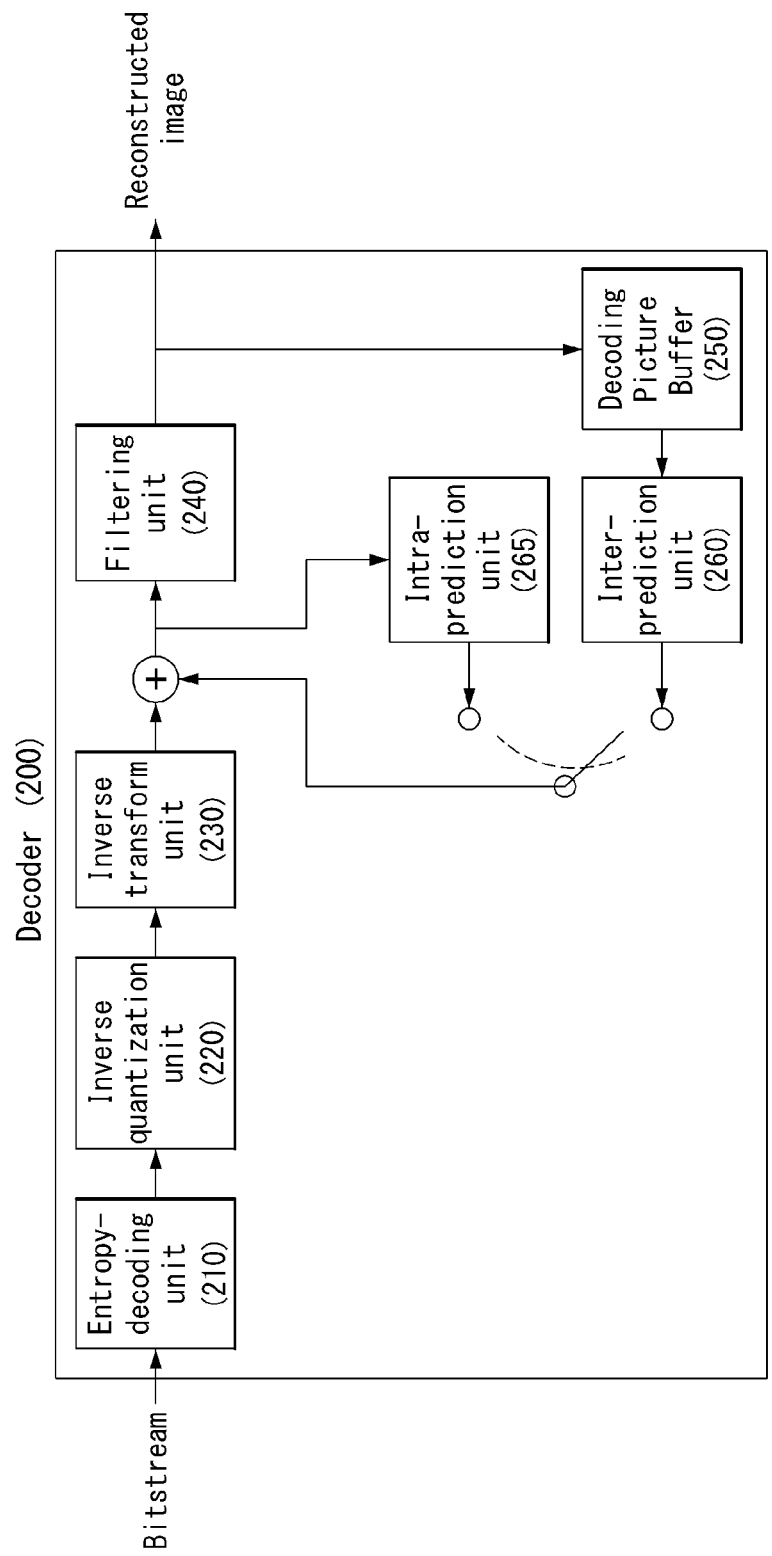
FIG. 2 is a block diagram illustrating a configuration of a decoder for decoding a video signal according to an embodiment of the present invention.

FIG. 2 is an embodiment to which the present invention is applied and shows a schematic block diagram of a decoder in which the decoding of a video signal is performed.

Referring to FIG. 2, the decoder 200 may be configured to include a parsing unit (not shown), an entropy decoding unit 210, a dequantization unit 220, an inverse transform unit 230, a filtering unit 240, a decoded picture buffer (DPB) unit 250, an inter prediction unit 260, an intra prediction unit 265 and a reconstruction unit (not shown).

For another example, the decoder 200 may be simply represented as including a parsing unit (not shown), a block split determination unit (not shown) and a decoding unit (not shown). In this case, embodiments to which the present invention is applied may be performed through the parsing unit (not shown), the block split determination unit (not shown) and the decoding unit (not shown).

The decoder 200 may receive a signal output by the encoder 100 of FIG. 1, and may parse or obtain a syntax element through the parsing unit (not shown). The parsed or obtained signal may be entropy-decoded through the entropy decoding unit 210.

The dequantization unit 220 obtains a transform coefficient from the entropy-decoded signal using quantization step size information.

The inverse transform unit 230 obtains a residual signal by inversely transforming the transform coefficient.

The reconstruction unit (not shown) generates a reconstructed signal by adding the obtained residual signal to a prediction signal output by the inter prediction unit 260 or the intra prediction unit 265.

The filtering unit 240 applies filtering to the reconstructed signal and outputs the filtered signal to a playback device or transmits it to the decoded picture buffer unit 250. The filtered signal transmitted to the decoded picture buffer unit 250 may be used as a reference picture in the inter prediction unit 260.

In this specification, the embodiments in the filtering unit 160, inter prediction unit 180 and intra prediction unit 185 of the encoder 100 may be identically applied to the filtering unit 240, inter prediction unit 260 and intra prediction unit 265 of the decoder, respectively.

In an embodiment of the present invention, the inter prediction unit 260 can improve a predictor using an optical flow in generalized bi-prediction.

In another embodiment of the present invention, the inter prediction unit 260 may obtain a further improved predictor using an adaptive weight factor in generalized bi-prediction.

In another embodiment of the present invention, the inter prediction unit 260 may obtain an improved predictor by performing bi-directional prediction by applying a weight to the gradient component of an optical flow predictor.

A reconstructed video signal output through the decoder 200 may be played back through a playback device.

Figure 3:
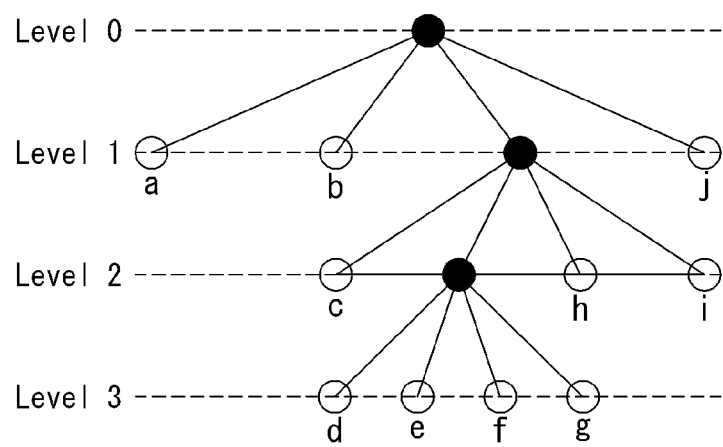
FIG. 3 is a diagram illustrating a division structure of a coding unit according to an embodiment of the present invention.
Figure 3:
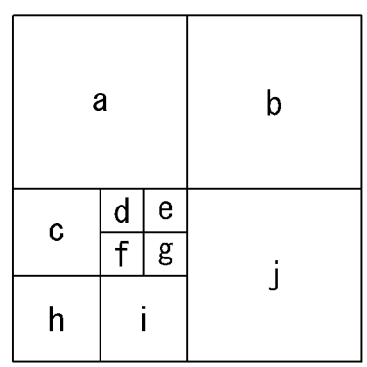

FIG. 3 is a diagram illustrating a division structure of a coding unit according to an embodiment of the present invention.

The encoder may split one video (or picture) in a coding tree unit (CTU) of a quadrangle form. The encoder sequentially encodes by one CTU in raster scan order.

For example, a size of the CTU may be determined to any one of 64×64, 32×32, and 16×16, but the present invention is not limited thereto. The encoder may select and use a size of the CTU according to a resolution of input image or a characteristic of input image. The CTU may include a coding tree block (CTB) of a luma component and a coding tree block (CTB) of two chroma components corresponding thereto.

One CTU may be decomposed in a quadtree (hereinafter referred to as a "QT") structure. For example, one CTU may be split into four units in which a length of each side reduces in a half while having a square form. Decomposition of such a QT structure may be recursively performed.

Referring to FIG. 3, a root node of the QT may be related to the CTU. The QT may be split until arriving at a leaf node, and in this case, the leaf node may be referred to as a coding unit (CU).

The CU may mean a basic unit of a processing process of input image, for example, coding in which intra/inter prediction is performed. The CU may include a coding block (CB) of a luma component and a CB of two chroma components corresponding thereto. For example, a size of the CU may be determined to any one of 64×64, 32×32, 16×16, and 8×8, but the present invention is not limited thereto, and when video is high resolution video, a size of the CU may further increase or may be various sizes.

Referring to FIG. 3, the CTU corresponds to a root node and has a smallest depth (i.e., level 0) value. The CTU may not be split according to a characteristic of input image, and in this case, the CTU corresponds to a CU.

The CTU may be decomposed in a QT form and thus subordinate nodes having a depth of a level 1 may be generated. In a subordinate node having a depth of a level 1, a node (i.e., a leaf node) that is no longer split corresponds to the CU. For example, as shown in FIG. 3B, CU(a), CU(b), and CU(j) corresponding to nodes a, b, and j are split one time in the CTU and have a depth of a level 1.

At least one of nodes having a depth of a level 1 may be again split in a QT form. In a subordinate node having a depth of a level 2, a node (i.e., a leaf node) that is no longer split corresponds to a CU. For example, as shown in FIG. 3B, CU(c), CU(h), and CU(i) corresponding to nodes c, h, and l are split twice in the CTU and have a depth of a level 2.

Further, at least one of nodes having a depth of a level 2 may be again split in a QT form. In a subordinate node having a depth of a level 3, a node (i.e., a leaf node) that is no longer split corresponds to a CU. For example, as shown in FIG. 3B, CU(d), CU(e), CU(f), and CU(g) corresponding to d, e, f, and g are split three times in the CTU and have a depth of a level 3.

The encoder may determine a maximum size or a minimum size of the CU according to a characteristic (e.g., a resolution) of video or in consideration of encoding efficiency. Information thereof or information that can derive this may be included in bit stream. A CU having a maximum size may be referred to as a largest coding unit (LCU), and a CU having a minimum size may be referred to as a smallest coding unit (SCU).

Further, the CU having a tree structure may be hierarchically split with predetermined maximum depth information (or maximum level information). Each split CU may have depth information. Because depth information represents the split number and/or a level of the CU, the depth information may include information about a size of the CU.

Because the LCU is split in a QT form, when using a size of the LCU and maximum depth information, a size of the SCU may be obtained. Alternatively, in contrast, when using a size of the SCU and maximum depth information of a tree, a size of the LCU may be obtained.

For one CU, information representing whether a corresponding CU is split may be transferred to the decoder. For example, the information may be defined to a split flag and may be represented with "split_cu_flag". The split flag may be included in the entire CU, except for the SCU. For example, when a value of the split flag is '1', a corresponding CU is again split into four CUs, and when a value of the split flag is '0', a corresponding CU is no longer split and a coding process of the corresponding CU may be performed.

In an embodiment of FIG. 3, a split process of the CU is exemplified, but the above-described QT structure may be applied even to a split process of a transform unit (TU), which is a basic unit that performs transform.

The TU may be hierarchically split in a QT structure from a CU to code. For example, the CU may correspond to a root node of a tree of the transform unit (TU).

Because the TU is split in a QT structure, the TU split from the CU may be again split into a smaller subordinate TU. For example, a size of the TU may be determined to any one of 32×32, 16×16, 8×8, and 4×4, but the present invention is not limited thereto, and when the TU is high resolution video, a size of the TU may increase or may be various sizes.

For one TU, information representing whether a corresponding TU is split may be transferred to the decoder. For example, the information may be defined to a split transform flag and may be represented with a "split_transform_flag".

The split transform flag may be included in entire TUs, except for a TU of a minimum size. For example, when a value of the split transform flag is '1', a corresponding TU is again split into four TUs, and a value of the split transform flag is '0', a corresponding TU is no longer split.

As described above, the CU is a basic unit of coding that performs intra prediction or inter prediction. In order to more effectively code input image, the CU may be split into a prediction unit (PU).

A PU is a basic unit that generates a prediction block, and a prediction block may be differently generated in a PU unit even within one CU. The PU may be differently split according to whether an intra prediction mode is used or an inter prediction mode is used as a coding mode of the CU to which the PU belongs.

Figure 4:
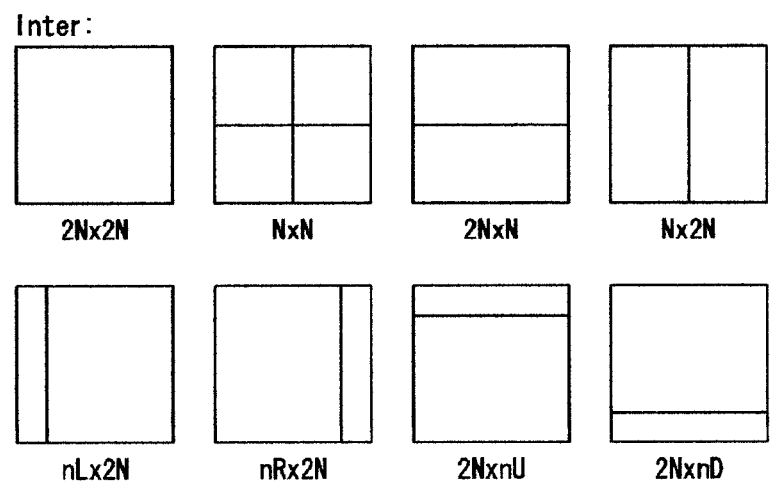
FIG. 4 is an embodiment to which the present invention is applied and is a diagram for illustrating a prediction unit.

FIG. 4 is an embodiment to which the present invention is applied and is a diagram for illustrating a prediction unit.

A PU is differently partitioned depending on whether an intra-prediction mode or an inter-prediction mode is used as the coding mode of a CU to which the PU belongs.

FIG. 4(a) illustrates a PU in the case where the intra-prediction mode is used as the coding mode of a CU to which the PU belongs, and FIG. 4(b) illustrates a PU in the case where the inter-prediction mode is used as the coding mode of a CU to which the PU belongs.

Referring to FIG. 4(a), assuming the case where the size of one CU is 2N×2N (N=4, 8, 16 or 32), one CU may be partitioned into two types (i.e., 2N×2N and N×N).

In this case, if one CU is partitioned as a PU of the 2N×2N form, this means that only one PU is present within one CU.

In contrast, if one CU is partitioned as a PU of the N×N form, one CU is partitioned into four PUs and a different prediction block for each PU is generated. In this case, the partition of the PU may be performed only if the size of a CB for the luma component of a CU is a minimum size (i.e., if the CU is an SCU).

Referring to FIG. 4(b), assuming that the size of one CU is 2N×2N (N=4, 8, 16 or 32), one CU may be partitioned into eight PU types (i.e., 2N×2N, N×N, 2N×N, N×2N, nL×2N, nR×2N, 2N×nU and 2N×nD).

As in intra-prediction, the PU partition of the N×N form may be performed only if the size of a CB for the luma component of a CU is a minimum size (i.e., if the CU is an SCU).

In inter-prediction, the PU partition of the 2N×N form in which a PU is partitioned in a traverse direction and the PU partition of the N×2N form in which a PU is partitioned in a longitudinal direction are supported.

Furthermore, the PU partition of nL×2N, nR×2N, 2N×nU and 2N×nD forms, that is, asymmetric motion partition (AMP) forms, are supported. In this case, 'n' means a ¼ value of 2N. However, the AMP cannot be used if a CU to which a PU belongs is a CU of a minimum size.

In order to efficiently code an input image within one CTU, an optimum partition structure of a coding unit (CU), a prediction unit (PU) and a transform unit (TU) may be determined based on a minimum rate-distortion value through the following execution process. For example, an optimum CU partition process within a 64×64 CTU is described. A rate-distortion cost may be calculated through a partition process from a CU of a 64×64 size to a CU of an 8×8 size, and a detailed process thereof is as follows.

1) A partition structure of an optimum PU and TU which generates a minimum rate-distortion value is determined by performing inter/intra-prediction, transform/quantization and inverse quantization/inverse transform and entropy encoding on a CU of a 64×64 size.

2) The 64×64 CU is partitioned into four CUs of a 32×32 size, and an optimum partition structure of a PU and a TU which generates a minimum rate-distortion value for each of the 32×32 CUs is determined.

3) The 32×32 CU is partitioned into four CUs of a 16×16 size again, and an optimum partition structure of a PU and a TU which generates a minimum rate-distortion value for each of the 16×16 CUs is determined.

4) The 16×16 CU is partitioned into four CUs of an 8×8 size again, and an optimum partition structure of a PU and a TU which generates a minimum rate-distortion value for each of the 8×8 CUs is determined.

5) An optimum partition structure of a CU within a 16×16 block is determined by comparing the rate-distortion value of a 16×16 CU calculated in the process 3) with the sum of the rate-distortion values of the four 8×8 CUs calculated in the process 4). This process is performed on the remaining three 16×16 CUs in the same manner.

6) An optimum partition structure of a CU within a 32×32 block is determined by comparing the rate-distortion value of a 32×32 CU calculated in the process 2) with the sum of the rate-distortion values of the four 16×16 CUs calculated in the process 5). This process is performed on the remaining three 32×32 CUs in the same manner.

7) Finally, an optimum partition structure of a CU within a 64×64 block is determined by comparing the rate-distortion value of the 64×64 CU calculated in the process 1) with the sum of the rate-distortion values of the four 32×32 CUs obtained in the process 6).

In the intra-prediction mode, a prediction mode is selected in a PU unit and prediction and a reconfiguration are performed in an actual TU unit with respect to the selected prediction mode.

The TU means a basic unit by which actual prediction and a reconfiguration are performed. The TU includes a transform block (TB) for a luma component and a TB for two chroma components corresponding to the TB for a luma component.

In the example of FIG. 3, as in the case where one CTU is partitioned as a quadtree structure to generate a CU, a TU is hierarchically partitioned as a quadtree structure from one CU to be coded.

The TU is partitioned as a quadtree structure, and thus a TU partitioned from a CU may be partitioned into smaller lower TUs. In HEVC, the size of the TU may be determined to be any one of 32×32, 16×16, 8×8 and 4×4.

Referring back to FIG. 3, it is assumed that the root node of a quadtree is related to a CU. The quadtree is partitioned until a leaf node is reached, and the leaf node corresponds to a TU.

More specifically, a CU corresponds to a root node and has the smallest depth (i.e., depth=0) value. The CU may not be partitioned depending on the characteristics of an input image. In this case, a CU corresponds to a TU.

The CU may be partitioned in a quadtree form. As a result, lower nodes of a depth 1 (depth=1) are generated. Furthermore, a node (i.e., leaf node) that belongs to the lower nodes having the depth of 1 and that is no longer partitioned corresponds to a TU. For example, in FIG. 3(b), a TU(a), a TU(b) and a TU(j) corresponding to nodes a, b and j, respectively, have been once partitioned from the CU, and have the depth of 1.

At least any one of the nodes having the depth of 1 may be partitioned in a quadtree form again. As a result, lower nodes having a depth 2 (i.e., depth=2) are generated. Furthermore, a node (i.e., leaf node) that belongs to the lower nodes having the depth of 2 and that is no longer partitioned corresponds to a TU. For example, in FIG. 3(b), a TU(c), a TU(h) and a TU(i) corresponding to nodes c, h and i, respectively, have been twice partitioned from the CU, and have the depth of 2.

Furthermore, at least any one of the nodes having the depth of 2 may be partitioned in a quadtree form again. As a result, lower nodes having a depth 3 (i.e., depth=3) are generated. Furthermore, a node (i.e., leaf node) that belongs to the lower nodes having the depth of 3 and that is no longer partitioned corresponds to a CU. For example, in FIG. 3(b), a TU(d), a TU(e), a TU(f) and a TU(g) corresponding to nodes d, e, f and g, respectively, have been partitioned three times from the CU, and have the depth of 3.

A TU having a tree structure has predetermined maximum depth information (or the greatest level information) and may be hierarchically partitioned. Furthermore, each partitioned TU may have depth information. The depth information may include information about the size of the TU because it indicates the partitioned number and/or degree of the TU.

Regarding one TU, information (e.g., a partition TU flag "split_transform_flag") indicating whether a corresponding TU is partitioned may be transferred to the decoder. The partition information is included in all of TUs other than a TU of a minimum size. For example, if a value of the flag indicating whether a corresponding TU is partitioned is "1", the corresponding TU is partitioned into four TUs again. If a value of the flag indicating whether a corresponding TU is partitioned is "0", the corresponding TU is no longer partitioned.

Figure 5:
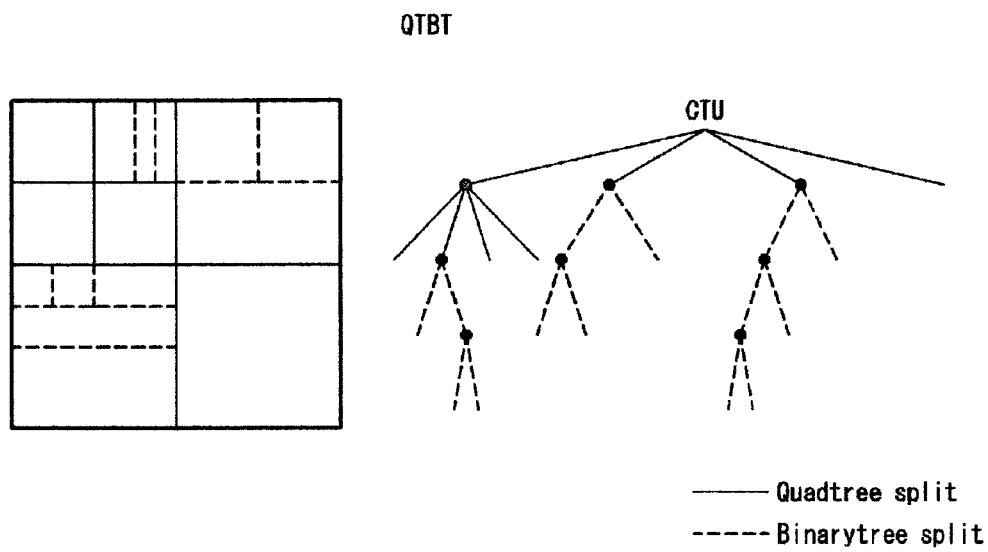
FIG. 5 is an embodiment to which the present invention is applied and is a diagram for illustrating a quadtree binary tree (hereinafter referred to as a "QTBT") block split structure.

FIG. 5 is an embodiment to which the present invention is applied and is a diagram for illustrating a quadtree binary tree (hereinafter referred to as a "QTBT") block split structure.

Quad-Tree Binary-Tree (QTBT)

A QTBT refers to a structure of a coding block in which a quadtree structure and a binarytree structure have been combined. Specifically, in a QTBT block split structure, an image is coded in a CTU unit. A CTU is split in a quadtree form. A leaf node of a quadtree is additionally split in a binarytree form.

Hereinafter, a QTBT structure and a split flag syntax supporting the same are described with reference to FIG. 5.

Referring to FIG. 5, a current block may be split in a QTBT structure. That is, a CTU may be first hierarchically split in a quadtree form. Furthermore, a leaf node of the quadtree that is no longer spit in a quadtree form may be hierarchically split in a binarytree form.

The encoder may signal a split flag in order to determine whether or not to split a quadtree in a QTBT structure. In this case, the quadtree split may be adjusted (or limited) by a MinQTLumaISlice, MinQTChromaISlice or MinQTNonISlice value. In this case, MinQTLumaISlice indicates a minimum size of a quadtree leaf node of a luma component in an I-slice. MinQTLumaChromaSlice indicates a minimum size of a quadtree leaf node of a chroma component in an I-slice. MinQTNonISlice indicates a minimum size of a quadtree leaf node in a non-I-slice.

In the quadtree structure of a QTBT, a luma component and a chroma component may have independent split structures in an I-slice. For example, in the case of an I-slice in the QTBT structure, the split structures of a luma component and chroma component may be differently determined. In order to support such a split structure, MinQTLumaISlice and MinQTChromaISlice may have different values.

For another example, in a non-I-slice of a QTBT, the split structures of a luma component and chroma component in the quadtree structure may be identically determined. For example, in the case of a non-I-slice, the quadtree split structures of a luma component and chroma component may be adjusted by a MinQTNonISlice value.

In a QTBT structure, a leaf node of the quadtree may be split in a binarytree form. In this case, the binarytree split may be adjusted (or limited) by MaxBTDepth, MaxBTDepthISliceL and MaxBTDepthISliceC. In this case, MaxBTDepth indicates a maximum depth of the binarytree split based on a leaf node of the quadtree in a non-I-slice. MaxBTDepthISliceL indicates a maximum depth of the binarytree split of a luma component in an I-slice. MaxBTDepthISliceC indicates a maximum depth of the binarytree split of a chroma component in the I-slice.

Furthermore, in the I-slice of a QTBT, MaxBTDepthISliceL and MaxBTDepthISliceC may have different values in the I-slice because a luma component and a chroma component may have different structures.

In the case of the split structure of a QTBT, the quadtree structure and the binarytree structure may be used together. In this case, the following rule may be applied.

First, MaxBTSize is smaller than or equal to MaxQTSize. In this case, MaxBTSize indicates a maximum size of a binarytree split, and MaxQTSize indicates a maximum size of the quadtree split.

Second, a leaf node of a QT becomes the root of a BT.

Third, once a split into a BT is performed, it cannot be split into a QT again.

Fourth, a BT defines a vertical split and a horizontal split.

Fifth, MaxQTDepth, MaxBTDepth are previously defined. In this case, MaxQTDepth indicates a maximum depth of a quadtree split, and MaxBTDepth indicates a maximum depth of a binarytree split.

Sixth, MaxBTSize, MinQTSize may be different depending on a slice type.

Figure 6:
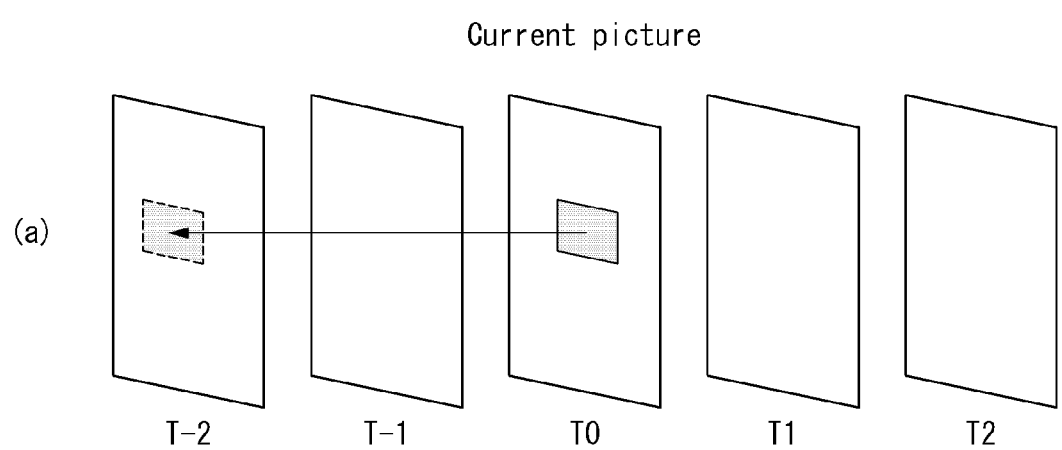
FIG. 6 is an embodiment to which the present invention is applied and is a diagram for illustrating uni-directional inter prediction and bi-directional inter prediction.
Figure 6:
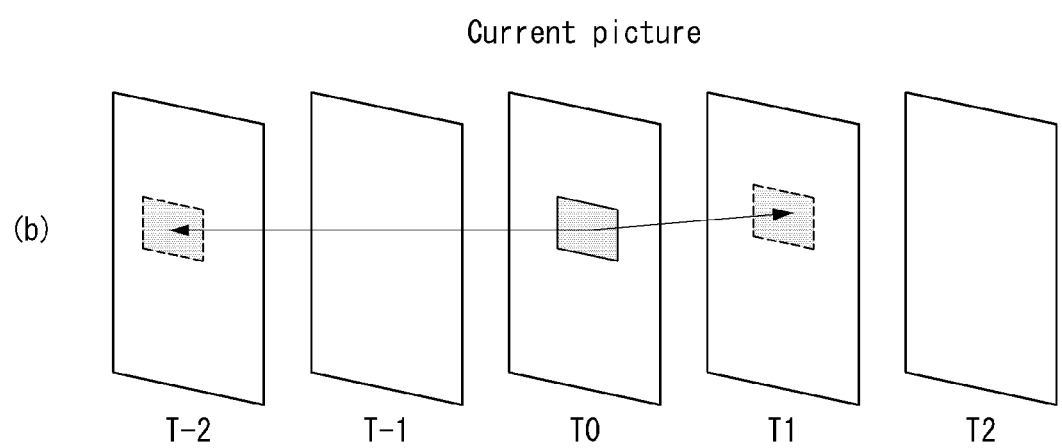

FIG. 6 is an embodiment to which the present invention is applied and is a diagram for illustrating uni-directional inter prediction and bi-directional inter prediction.

Inter prediction may be divided into uni-directional prediction in which only one past picture or future picture is used as a reference picture on a time axis with respect to one block and bi-directional prediction in which reference is made to the past and future pictures at the same time.

FIG. 6(a) shows uni-directional prediction, and FIG. 6(b) shows bi-directional prediction.

Referring to FIG. 6(a), it may be seen that a current picture is present in a T0 time and refers to a picture in a (T−2) time for inter prediction. Furthermore, referring to FIG. 6(b), it may be seen that a current picture is present in a T0 time and refers to two pictures, that is, a picture in a (T−2) time and a picture in a T1 time, for inter prediction.

Furthermore, uni-directional prediction may be divided into forward direction prediction using one reference picture displayed (or output) prior to a current picture temporally and backward direction prediction using one reference picture displayed (or output) after a current picture temporally.

In an inter prediction process (i.e., uni-directional or bi-directional prediction), a motion parameter (or information) used to specify that which reference region (or reference block) is used to predict a current block includes an inter prediction mode (in this case, the inter prediction mode may indicate a reference direction (i.e., uni-directional or bi-directional) and a reference list (i.e., L0, L1 or bi-direction)), a reference index (or reference picture index or reference list index), motion vector information. The motion vector information may include a motion vector, motion vector prediction (MVP) or a motion vector difference (MVD). The motion vector difference means a difference between a motion vector and a motion vector prediction.

In uni-directional prediction, a motion parameter for one-side direction is used. That is, one motion parameter may be necessary to specify a reference region (or reference block).

In bi-directional prediction, a motion parameter for both-side directions is used. In a bi-directional prediction method, a maximum of two reference regions may be used. The two reference regions may be present in the same reference picture or may be present in different pictures, respectively. That is, in the bi-directional prediction method, a maximum of two motion parameters may be used. Two motion vectors may have the same reference picture index or may have different reference picture indices. In this case, both the reference pictures may be displayed (or output) prior to a current picture temporally or may be displayed (or output) after a current picture.

The encoder performs motion estimation for finding a reference region most similar to a current processing block from reference pictures in an inter prediction process. Furthermore, the encoder may provide the decoder with a motion parameter for the reference region.

The encoder or the decoder may obtain the reference region of the current processing block using the motion parameter. The reference region is present in a reference picture having the reference index. Furthermore, a pixel value or interpolated value of the reference region specified by a motion vector may be used as the predictor of the current processing block. That is, motion compensation for predicting an image of the current processing block from a previously decoded picture using motion information is performed.

In order to reduce the amount of transmission related to motion vector information, a method of obtaining a motion vector prediction (mvp) using motion information of previously coded blocks and transmitting only a difference (mvd) therefor may be used. That is, the decoder obtains a motion vector prediction of a current processing block using motion information of decoded other blocks and obtains a motion vector value for the current processing block using a difference transmitted by the encoder. In obtaining the motion vector prediction, the decoder may obtain various motion vector candidate values using motion information of already decoded other blocks, and may obtain one of the motion vector candidate values as a motion vector prediction.

Figure 7:
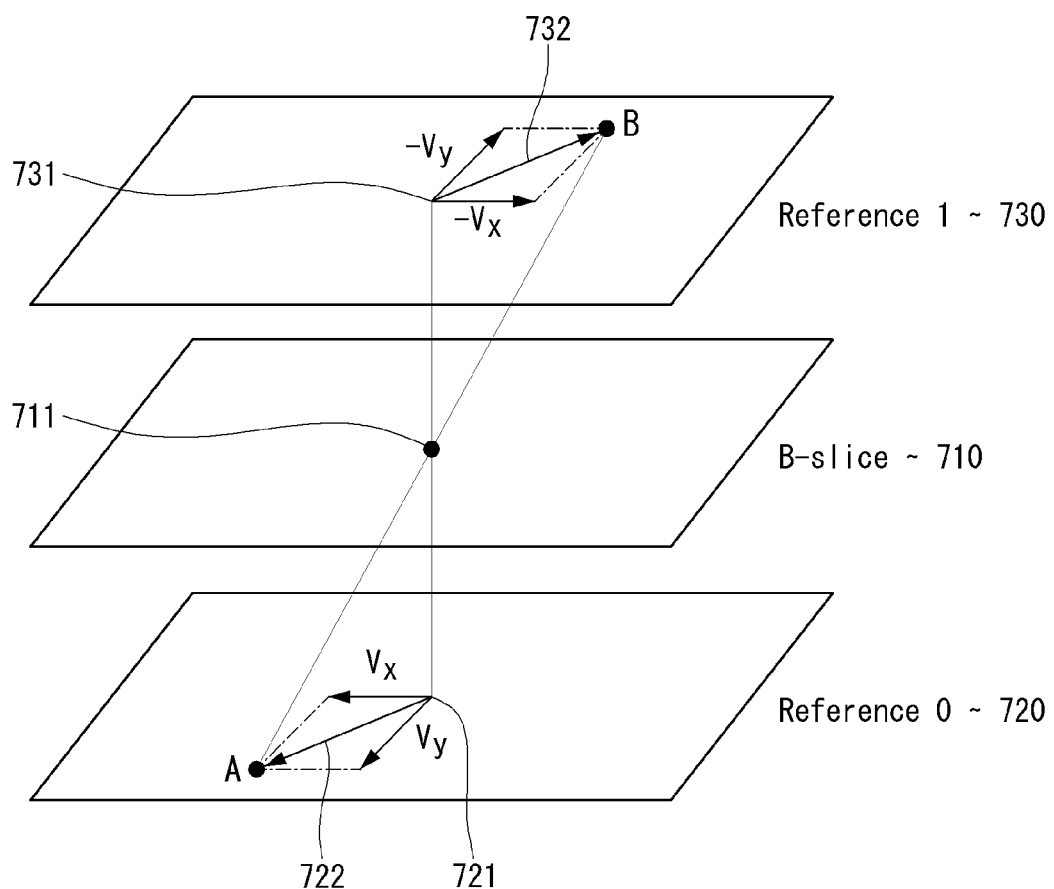
FIG. 7 is an embodiment to which the present invention is applied and is a diagram for illustrating a bi-directional optical flow.

FIG. 7 is an embodiment to which the present invention is applied and is a diagram for illustrating a bi-directional optical flow.

Optical Flow (OF)

An optical flow refers to a motion pattern of an object, a surface or an edge in a field of vision. That is, a pattern of a motion, such as an object, is obtained by sequentially extracting differences between images in a specific time and a previous time. In this case, information on more motions can be obtained compared to a case where a difference between a current frame and a previous frame is simply obtained. An optical flow has a level of important contribution, such as enabling a target point of a moving object to be found in the visual recognition function of an animal having a field of vision and helping understanding of the structure of a surrounding environment. Technically, in the computer vision system, the optical flow may be used to interpret a three-dimensional image or for image compression.

Several methods of realizing the optical flow have been presented.

In a motion compensation method adopting the optical flow, assuming that a pixel value of an object is not changed in contiguous frames (brightness constancy constraint (BCC)), a motion of the object may be represented like Equation 1.

$$I(x,y,t)=I(x+\Delta x, y+\Delta y, t+\Delta t)$$ [Equation 1]

In this case, I(x, y, t) indicates a pixel value of (x, y) coordinates in a time t, and Δ indicates a change. That is, Δx indicates a change of x coordinates, Δy indicates a change of y coordinates, and Δt indicates a change of a time t.

If a small motion for a short time is assumed, in Equation 1, the right term may be represented as a primary equation of Taylor series and may be expanded like Equation 2.

$$I(x, y, t) = I(x, y, t) + \frac{\partial I}{\partial x}\Delta x + \frac{\partial I}{\partial y}\Delta y + \frac{\partial I}{\partial t}\Delta t$$ [Equation 2]

Furthermore, if Equation 2 is divided by a change Δt of a time t and V_x=Δx/Δt, V_y=Δy/Δt, Equation 2 may be arranged like Equation 3.

$$0 = \frac{dI}{dt} = \frac{\partial I}{\partial x}V_x + \frac{\partial I}{\partial y}V_y + \frac{\partial I}{\partial t}$$ [Equation 3]

In this case, V_x and V_y mean the x-axis component and y-axis component of an optical flow (or optical flow motion vector) in I(x, y, t). ∂I/∂x, ∂I/∂y, and ∂I/∂t indicate derivatives in the x-axis, y-axis, and t-axis direction in the I(x, y, t), respectively. They may be hereinafter referred to as I_x, I_y, and I_t, respectively, in this specification.

If I_x, I_y, and I_t are found, an optical flow (or optical flow motion vector) V={V_x, V_y} can be obtained.

If Equation 3 is represented in a matrix form, it may be represented like Equation 4.

$$[I_x \; I_y]\begin{bmatrix} V_x \\ V_y \end{bmatrix} = -I_t$$ [Equation 4]

In this case, assuming that A=[I_x, I_y], V=[V_x, V_y]^T, b=−I_t, Equation 4 may be represented like Equation 5.

$$AV=b$$ [Equation 5]

In order to obtain the optical flow (or optical flow motion vector) V, in general, a least-square (LS) estimation method is used. First, a square error E, that is, an LS estimator, may be designed like Equation 6.

$$E = \sum_\omega g(\omega) \times (I_x V_x + I_y V_y + I_t)^2$$ [Equation 6]

An LS estimator, such as Equation 6, may be designed by taking into consideration the following two.

1) A locally steady motion is assumed in order to solve an ill-posed problem. That is, it may be assumed that optical flows corresponding to pixel values included in a given window w region are similar.

2) A weighting function g of assigning a small weight to a pixel value far from a window center value and assigning a large weight to a pixel value close to the window center value is considered.

In order to obtain the optical flow V that minimizes the square error E, Equation 6 may be arranged like Equation 7 so that a derivative value for V_x, V_y becomes 0.

$$\frac{\partial E}{\partial V_x} = \sum_\omega g(\omega) \times (V_x I_x^2 + V_y I_x I_y + I_x I_t) = 0$$

$$\frac{\partial E}{\partial V_y} = \sum_\omega g(\omega) \times (V_y I_y^2 + V_x I_x I_y + I_y I_t) = 0$$ [Equation 7]

Equation 7 may be represented in a matrix form, such as Equation 8.

$$MV=b$$ [Equation 8]

In this case, matrices) M, b are the same as Equation 9.

$$M = \begin{bmatrix} \sum_\omega g I_x^2 & \sum_\omega g I_x I_y \\ \sum_\omega g I_x I_y & \sum_\omega g I_y^2 \end{bmatrix}$$

$$b = -\begin{bmatrix} \sum_\omega g I_x I_t \\ \sum_\omega g I_y I_t \end{bmatrix}$$ [Equation 9]

Accordingly, the optical flow V by the LS estimator may be determined like Equation 10.

$$V = M^{-1}b \quad \text{[Equation 10]}$$

Bi-Directional Optical Flow (BIO)

A BIO is a method of obtaining a motion vector value and a reference sample (or prediction sample) value in a sample (pixel) unit without the transmission of an additional motion vector (MV) using an optical flow.

It is assumed that the object moves at stead speed for a short time in addition to the first assumption (when the object moves for a short time, a pixel value thereof is not changed) of the optical flow.

FIG. 7 illustrates a case where bi-directional reference pictures 720, 730 are present with reference to a current picture (or B-slice) 710.

In this case, as described above, assuming that an object has a steady motion, when the bi-directional reference pictures 720, 730 are present with reference to the current picture 710, a motion vector (hereinafter referred to as a "first motion vector") 722 from a correspondence pixel (hereinafter referred to as a "first correspondence pixel") 721 within a (collocated) reference picture 0 720 (i.e., having the same coordinates as a current pixel 711) corresponding to the current pixel 711 within the current picture 710 to a position A and a motion vector (hereinafter referred to as a "second motion vector") 732 from a correspondence pixel (hereinafter referred to as a "second correspondence pixel") 731 within a (collocated) reference picture 1 730 (i.e., having the same coordinates as the current pixel 711) corresponding to the current pixel 711 to a position B may be represented as symmetrical values.

That is, the first motion vector 722 and the second motion vector 732 may be represented as vectors having the same size and opposite directions.

A difference between the pixel values of the position A and the position B may be represented like Equation 11 according to the above-described two assumptions.

$$\Delta[i,j] = I^0[i+v_x, j+v_y] - I^1[i-v_x, j-v_y] \quad \text{[Equation 11]}$$

In this case, I^0[i+v_x, j+v_y] is a pixel value of the position A of the reference picture 0 (Ref0) 720, and I^1[i-v_x, j-v_y] is a pixel value of the position B of the reference picture 1 (Ref1) 730. Furthermore, (i, j) means the coordinates of the current pixel 711 within the current picture 710.

Each pixel value may be represented like Equation 12.

$$I^0[i+v_x, j+v_y] = I^0[i,j] + \frac{\partial I^0[i,j]}{\partial x}v_x + \frac{\partial I^0[i,j]}{\partial y}v_y$$

$$I^1[i-v_x, j-v_y] = I^1[i,j] - \frac{\partial I^1[i,j]}{\partial x}v_x - \frac{\partial I^1[i,j]}{\partial y}v_y \quad \text{[Equation 12]}$$

When Equation 11 is substituted into Equation 12, it may be arranged like Equation 13.

$$\Delta[i,j] = I^{(0)}[i,j] - I^{(1)}[i,j] + v_x[i,j](I_x^{(0)}[i,j] + I_x^{(1)}[i,j]) + v_y[i,j](I_y^{(0)}[i,j] + I_y^{(1)}[i,j]) \quad \text{[Equation 13]}$$

In this case, I_x^(0)[i,j] and I_y^(0)[i,j] are x-axis and y-axis derivative values at the first correspondence pixel position within the reference picture 0 (Ref0) 720. I_x^(1)[i,j] and I_y^(1)[i,j] are x-axis and y-axis derivative values at the second correspondence pixel position within the reference picture 1 (Ref1) 730. This mean the gradient (or grade, change) of a pixel at a [i,j] position.

Table 1 shows interpolation filter coefficients which may be used to calculate a BIO gradient (or grade, change).

TABLE 1

| Fractional pel position | Interpolation filter for gradient |
| --- | --- |
| 0 | {8, −39, −3, 46, −17, 5}, |
| ¼ | {4, −17, −36, 60, −15, 4}, |
| 2/4 | {−1.4, −57, 57, −4, 1}, |
| ¾ | {−4, 15, −60, 36, 17, −4} |

The BIO gradient may be determined using Equation 14 and the interpolation filter of Table 1.

$$I_x^{(k)}[i, j] = \sum_{n=-M+1}^{M} dF_n(\alpha_x^{(k)}) R^{(k)}[i+n, j], k = 0 \text{ or } 1$$

$$I_y^{(k)}[i, j] = \sum_{n=-M+1}^{M} dF_n(\alpha_y^{(k)}) R^{(k)}[i, j+n], k = 0 \text{ or } 1 \quad \text{[Equation 14]}$$

In this case, 2*M means a filter tab number. α_x^(k) means a fractional part of a motion vector in the x-axis direction. dF_n(α_x^(k)) means the coefficient of an n-th filter tab in α_x^(k). R^(k)[i+n, j] means a reconstructed pixel value of [i+n, j] coordinates within a reference picture k (k is 0 or 1).

As described above, it has been assumed that the pixel value of the object is not changed when the object moves for a short time. Accordingly, a motion vector V_x[i,j], V_y[i,j] of a pixel unit that minimizes Δ2(i, j) can be found according to Equation 13.

As a result, an object is to find a motion vector in which a pixel value of the position A within the reference picture 0 720 and a pixel value of the position B within the reference picture 1 730 have the same value (or a value having a minimum difference) in FIG. 7, but the motion vector having a minimum difference between the pixel values within a given window size can be found because an error between pixels may be large.

Assuming that a locally steady motion is present within a window Ω with reference to the coordinates [i,j] of the current pixel 711, the position of a pixel within the window of a (2M+1)×(2M+1) size may be represented as [i', j']. In this case, [i', j'] satisfies i−M≤i'≤i+M, j−j'≤j+M.

The terms of Equation 13 may be represented like Equation 15, for convenience of expressions.

$$Gx = (I_x^{(0)}[i',j'] + I_x^{(1)}[i',j'])$$

$$Gy = (I_y^{(0)}[i',j'] + I_y^{(1)}[i',j'])$$

$$\delta P = (P(0)[i',j] - P(1)[i',j'])$$

In this case, G_x shows the gradient of an x-axis (i.e., horizontal direction), G_y shows the gradient of a y-axis (i.e., vertical direction), and δP shows the gradient of a t-axis (time axis) (or a change of a pixel value over time).

Furthermore, a set of the gradients of all coordinate values of a corresponding block is referred to as a gradient map.

In Equation 15, I means a pixel value obtained by motion estimation and thus this is determined again as P.

When Equation 15 is arranged by substituting each term of Equation 13 into Equation 15 by taking into consideration the locally steady motion window, it results in Equation 16.

$$\sum_{\Omega} \Delta^2(i', j') = \left(Vx \sum_{\Omega} Gx + Vy \sum_{\Omega} Gy + \sum_{\Omega} \delta P\right)^2 \quad \text{[Equation 16]}$$

Furthermore, Equation 16 is arranged into Equation 17 by partially differentiating it using V_x, V_y.

$$Vx\Sigma_{\Omega}G^2x + Vy\Sigma_{\Omega}GxGy + \Sigma_{\Omega}Gx\delta P = 0$$

$$Vx\Sigma_{\Omega}GxGy + Vy\Sigma_{\Omega}G^2y + \Sigma_{\Omega}Gy\delta P = 0 \quad \text{[Equation 17]}$$

Furthermore, when S1 to S6 are arranged like Equation 18 in order to calculate V_x, V_y, Equation 17 may be expanded like Equation 19 and Equation 20.

$$s1 = \sum_{\Omega} G^2 x \quad \text{[Equation 18]}$$

$$s2 = s4 = \sum_{\Omega} GxGy$$

$$s3 = -\sum_{\Omega} Gx\delta P$$

$$s5 = \sum_{\Omega} G^2 y$$

$$s6 = -\sum_{\Omega} Gy\delta P$$

$$0 = \sum_{[i',j] \in \Omega} 2G_x(v_x G_x + v_y G_y + \delta P) \quad \text{[Equation 19]}$$

$$0 = \sum_{[i',j] \in \Omega} 2v_x G_x^2 + 2v_y G_x G_y + 2G_x \delta P$$

$$0 = 2v_x \sum_{[i',j] \in \Omega} G_x^2 + 2v_y \sum_{[i',j] \in \Omega} G_x G_y + 2 \sum_{[i',j] \in \Omega} G_x \delta P$$

$$0 = 2v_x s_1 + 2v_y s_2 - 2s_3$$

$$v_x = \frac{-v_y s_2 + s_3}{s_1}$$

$$0 = \sum_{[i',j] \in \Omega} 2G_y(v_x G_x + v_y G_y + \delta P) \quad \text{[Equation 20]}$$

$$0 = \sum_{[i',j] \in \Omega} (2v_x G_x G_y + 2v_y G_y^2 + 2G_y \delta P)$$

$$0 = 2v_x \sum_{[i',j] \in \Omega} G_x G_y + 2v_y \sum_{[i',j] \in \Omega} G_y^2 + 2 \sum_{[i',j] \in \Omega} G_y \delta P$$

$$0 = 2v_x s_4 + 2v_y s_5 - 2s_6$$

$$v_y = \frac{-v_x s_4 + s_6}{s_5}$$

As a result, if Equation 18 is used, V_x, V_y of Equation 17 may be arranged like Equation 21.

$$Vx = \frac{s3s5 - s2s6}{s1s5 - s3s4} \quad \text{[Equation 21]}$$

$$Vy = \frac{s1s6 - s3s4}{s1s5 - s2s4}$$

Accordingly, the predictor of the current pixel may be calculated like Equation 22 using V_x and V_y.

$$P = \frac{((P^{(0)} + P^{(1)}) + V_x(I_x^{(0)} - I_x^{(1)}) + V_y(I_y^{(0)} - I_y^{(1)}))}{2} \quad \text{[Equation 22]}$$

In this case, P indicates the predictor of the current pixel within the current block. P^(0) and P^(1) indicate the pixel values of (collocated) pixels (i.e., first correspondence pixel and second correspondence pixel) having the same coordinates as the current pixel in an L0 reference block and an L1 reference block, respectively.

The encoder or the decoder may require a heavy computational load when it calculates a motion vector of a pixel unit using Equation 21. Accordingly, in order to reduce computational complexity, Equation 21 may be approximated like Equation 23 and used.

$$Vx = \frac{s3}{s1} \quad \text{[Equation 23]}$$

$$Vy = \frac{s6 - Vx * s2}{s5}$$

The BIO method, that is, the optical flow motion vector refinement method, may be performed in a motion compensation process when bi-directional prediction is applied to a current block. A detailed method is described with reference to the following drawing.

Figure 8:
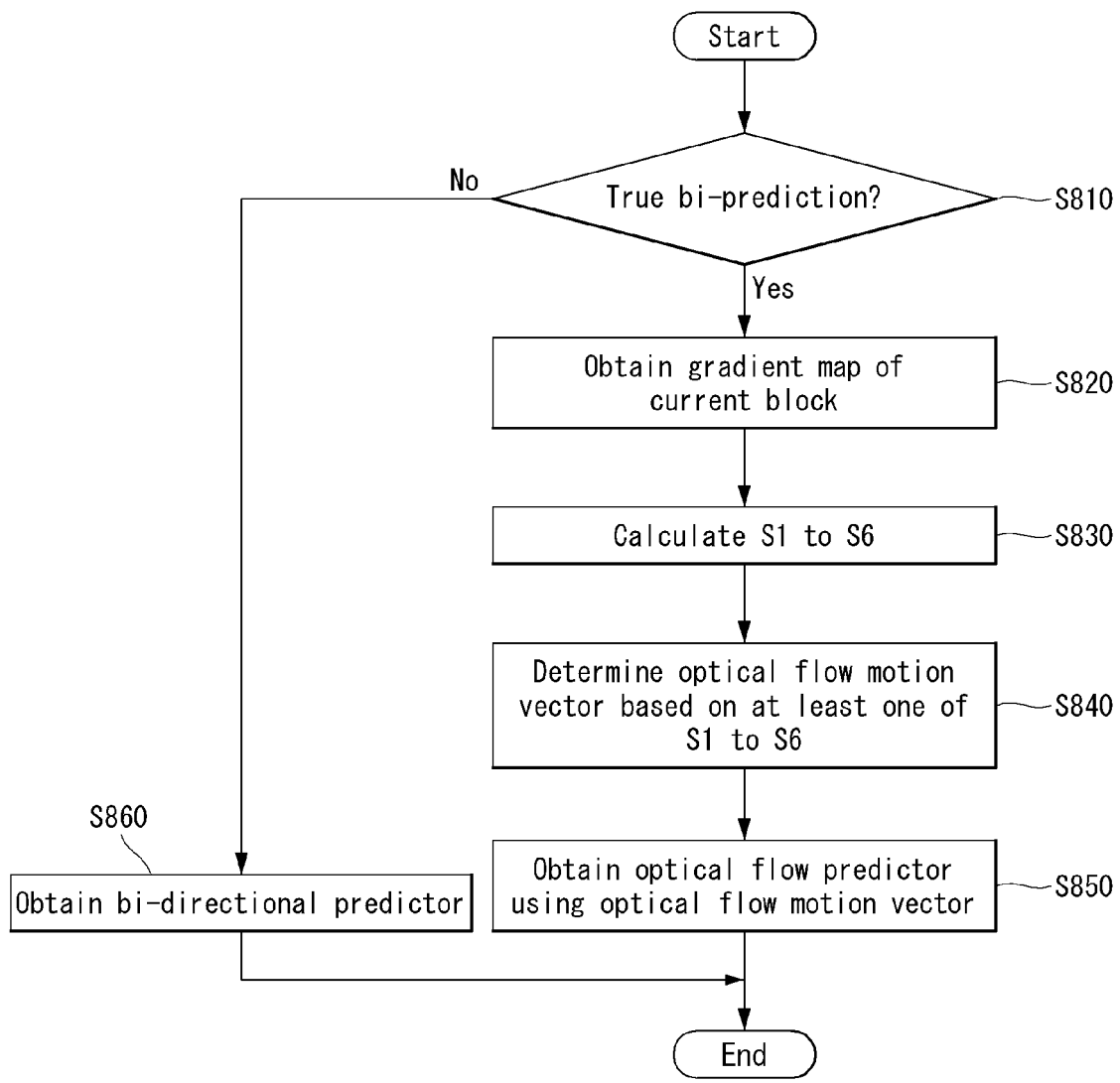
FIGS. 8 and 9 are embodiments to which the present invention is applied.
Figure 9:
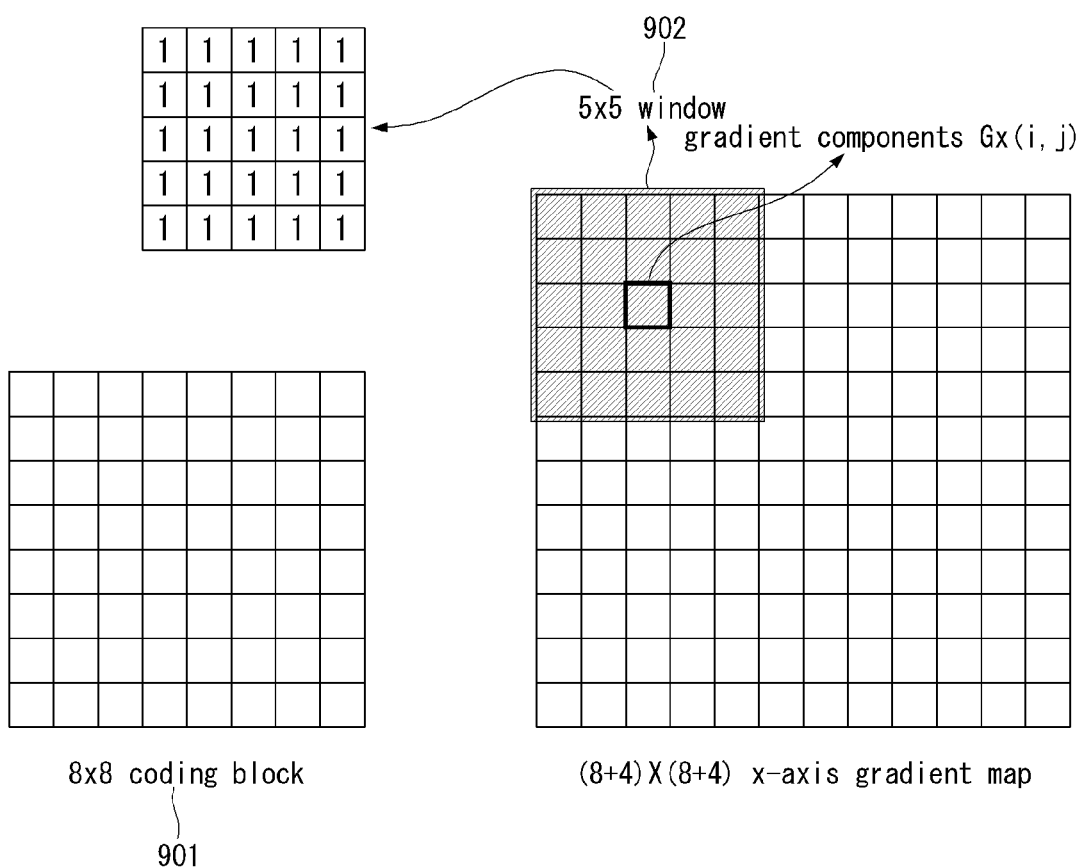

FIGS. 8 and 9 are embodiments to which the present invention is applied. FIG. 8 is a flowchart illustrating a method of performing optical flow motion compensation through bi-directional prediction, and FIG. 9 is a diagram for illustrating a method of determining a gradient map.

The encoder or the decoder determines whether true bi-prediction is applied to a current block (S810). In this case, the true bi-prediction means that a reference picture 0 (Ref0) and a reference picture 1 (Ref1) are opposite on a time axis with reference to the current picture.

That is, the encoder or the decoder determines whether bi-directional prediction is applied to the current block and the reference picture 0 (Ref0) and the reference picture 1 (Ref1) are opposite on the time axis with reference to the current block (or current picture) (i.e., the picture order count (POC) of the current picture is present between the POCs of the two reference pictures).

If, as a result of the determination in step S810, true bi-prediction is applied to the current block, the encoder or the decoder may obtain the gradient map of the current block (S820). In this case, the gradient map may mean a set of the gradients of all coordinate values of the current block.

Assuming that the width and height of the current block are w and h, the encoder or the decoder may obtain the gradients of respective correspondence pixels for an x-axis and a y-axis within a block of a (w+4)×(h+4) size, and may determine the gradients as the gradient maps of the x-axis and the y-axis, respectively.

FIG. 9 is a diagram illustrating a method of determining a gradient map.

Referring to FIG. 9, it is assumed that the size of a current block 901 is 8×8. If a window 902 of a 5×5 size is applied to the current block 901 of the 8×8 size, a gradient map of a 12×12 size may be determined.

Referring back to FIG. 8, the encoder or the decoder calculates S1 to S6 values using the window (902 in FIG. 9) of the 5×5 size (S830). In this case, the S1 to S6 values may be calculated using Equation 18.

The encoder or the decoder may determine the optical flow (OF) motion vector of a current pixel (S840). A method of determining the optical flow motion vector is described more specifically in FIG. 9.

The encoder or the decoder calculates the optical flow (OF) predictor, and may determine the calculated optical flow predictor as an optimal predictor (S850).

That is, the encoder or the decoder may calculate the predictor of the current pixel as in Equation 22 using the optical flow motion vector (or motion vector of a pixel unit) determined in step S840, and may determine the calculated predictor of the current pixel as an optimal predictor (or the final predictor of the current pixel).

If, as a result of the determination in step S810, true bi-prediction is not applied to the current block, the encoder or the decoder may calculate a bi-directional predictor by performing bi-directional prediction, and may determine the calculate bi-directional predictor as an optimal predictor (S860).

That is, if true bi-prediction is not applied to the current block, motion compensation of a pixel unit based on the optical flow may not be performed.

Figure 10:
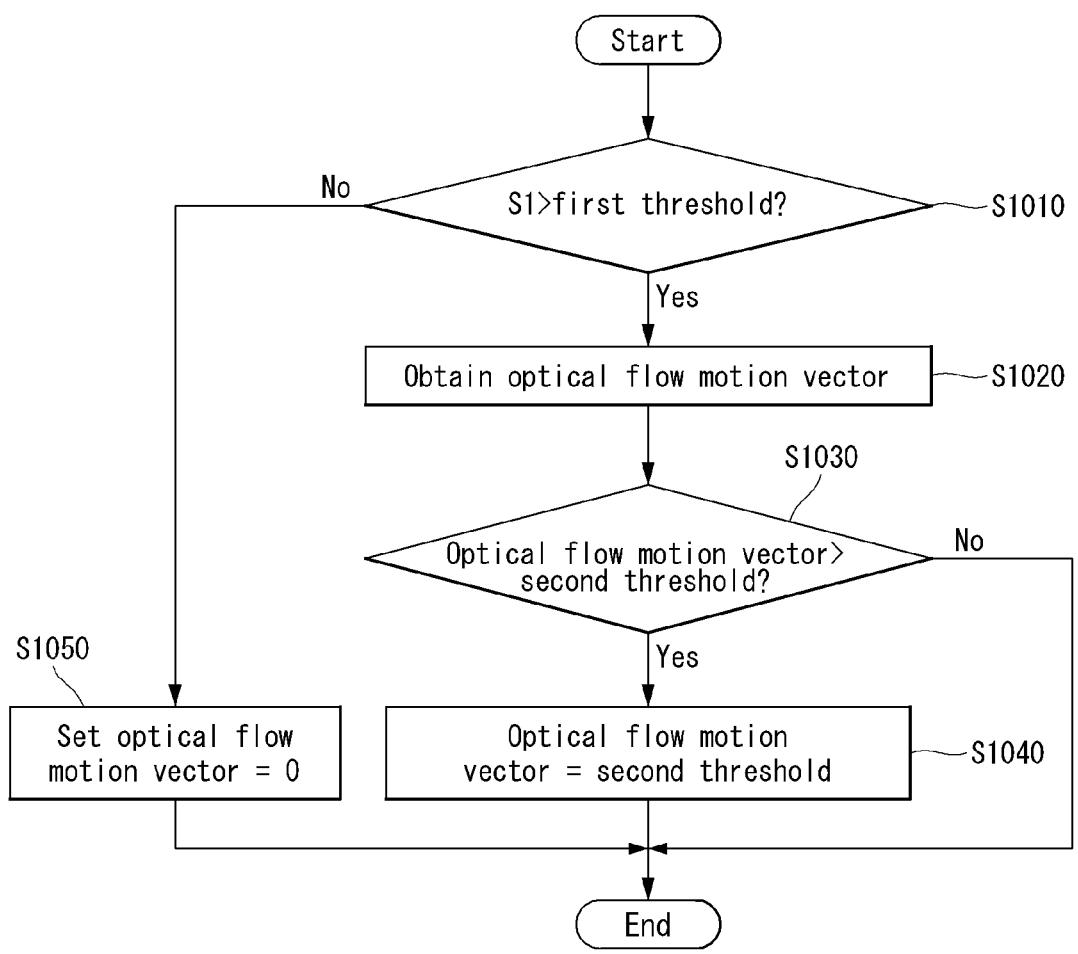
FIG. 10 is an embodiment to which the present invention is applied and is a diagram illustrating a method of determining an optical flow motion vector.

FIG. 10 is an embodiment to which the present invention is applied and is a diagram illustrating a method of determining an optical flow motion vector.

In FIG. 10, a method of determining the horizontal direction component (i.e., x-axis direction component) of an optical flow motion vector (or motion vector of a pixel unit) is described.

The encoder or the decoder determines whether an S1 value is greater than a specific threshold ("TH") (S1010). In this case, the specific threshold may be called a first threshold.

If, as a result of the determination in step S1010, the S1 value is greater than the threshold, the encoder or the decoder calculates a V_x value (S1020).

In this case, the encoder or the decoder may calculate the V_x value using Equation 19 or Equation 23 as described above.

The encoder or the decoder determines whether the V_x value calculated in step S1020 is greater than a limit (S1030). In this case, the limit may mean a threshold and may be called a second threshold in order to distinguish the threshold from the first threshold.

If, as a result of the determination in step S1030, the V_x value is greater than the limit, the encoder or the decoder sets the V_x value as the limit (S1040).

If, as a result of the determination in step S1030, the V_x value is not greater than the limit, the value calculated in step S1020 is determined as the V_x value.

If, as a result of the determination in step S1010, the S1 value is not greater than the threshold, the encoder or the decoder sets the V_x value to 0 (S1050).

The encoder or the decoder may determine an optical flow motion vector in a y-axis direction (i.e., the horizontal direction component of an optical flow motion vector (or a motion vector of a pixel unit)) using the method similar to that described in FIG. 10.

First, the encoder or the decoder determines whether an S5 value is greater than a specific threshold. If the S5 value is greater than the threshold, the encoder or the decoder calculates a V_y value using Equation 19 or Equation 23.

Furthermore, the encoder or the decoder determines whether the calculated V_y value is greater than a limit. If the calculated V_y value is greater than the limit, the encoder or the decoder sets the V_y value as the limit. If the calculated V_y value is not greater than the limit, the V_y value is determined as the calculated value.

Furthermore, if the S5 value is not greater than the threshold, the encoder or the decoder sets the V_y value to 0.

After V_x and V_y are determined, the encoder or the decoder may calculate an optical flow predictor (OF predictor) to which optical flow (OF) motion vector refinement has been applied in a pixel unit using Equation 22.

Generalized Bi-Prediction

The present invention provides a generalized bi-prediction method for obtaining a bi-directional predictor in inter coding.

In an embodiment, a bi-directional predictor may be obtained using an adaptive weight as in Equation 24.

$$P[x]=(1-w)*P0[x+v0]+w*P1[x+v1] \quad \text{[Equation 24]}$$

In this case, P[x] means the predictor of a current block at an x position, P1[x+v1], $\forall i \in [0,1]$ means a motion-compensated prediction block obtained using a motion vector (MV) $v_i$ in a reference picture $L_i$, (1−w) and w mean weight values. In this case, a set W of the weight values may be set as an embodiment, such as Equations 25 to 27.

$$W = \left\{\frac{3}{8}, \frac{1}{2}, \frac{5}{8}\right\} \quad \text{[Equation 25]}$$

$$W = \left\{\frac{1}{4}, \frac{3}{8}, \frac{1}{2}, \frac{5}{8}, \frac{3}{4}\right\} \quad \text{[Equation 26]}$$

$$W = \left\{-\frac{1}{4}, \frac{1}{4}, \frac{3}{8}, \frac{1}{2}, \frac{5}{8}, \frac{3}{4}, \frac{5}{4}\right\} \quad \text{[Equation 27]}$$

Bit allocations for the weight values of Equations 25 to 27 are the same as Table 2 to 4, respectively.

Tables 2 to 4 show index binarization schemes for the weight values of Equations 25 to 27, respectively.

TABLE 2

| | | Binarization Schemes | |
|---|---|---|---|
| Index | Weight value | Scheme #1 (mvd_l1_zero_flag = 0) | Scheme #2 (mvd_l1_zero_flag = 1) |
| 0 | 3/8 | 00 | 00 |
| 1 | 1/2 | 1 | 01 |
| 2 | 5/8 | 01 | 1 |

TABLE 3

| | | Binarization Schemes | |
|---|---|---|---|
| Index | Weight value | Scheme #1 (mvd_l1_zero_flag = 0) | Scheme #2 (mvd_l1_zero_flag = 1) |
| 0 | 1/4 | 0000 | 0000 |
| 1 | 3/8 | 001 | 0001 |
| 2 | 1/2 | 1 | 01 |
| 3 | 5/8 | 01 | 1 |
| 4 | 3/4 | 0001 | 001 |

TABLE 4

| | | Binarization Schemes | |
|---|---|---|---|
| Index | Weight value | Scheme #1 (mvd_l1_zero_flag = 0) | Scheme #2 (mvd_l1_zero_flag = 1) |
| 0 | +3¹1/4 | 000000 | 000000 |
| 1 | 1/4 | 00001 | 000001 |
| 2 | 3/8 | 001 | 0001 |
| 3 | 1/2 | 1 | 01 |
| 4 | 5/8 | 01 | 1 |

TABLE 4-continued

| | | Binarization Schemes | |
|---|---|---|---|
| Index | Weight value | Scheme #1 (mvd_l1_zero_flag = 0) | Scheme #2 (mvd_l1_zero_flag = 1) |
| 5 | 3/4 | 0001 | 001 |
| 6 | 5/4 | 000001 | 00001 |

In Tables 2 to 4, mvd_l1_zero_flag is determined in a slice header. When mvd_l1_zero_flag=1, an MVD value of L0 is determined as 0 and only an MVD value of L1 is transmitted. When mvd_l1_zero_flag=0, the MVD values of L0 and L1 are transmitted.

In another embodiment, in generalized bi-prediction, a BIO predictor may be defined like Equation 28.

$$P = ((1-w) \cdot P^{(0)} + w \cdot P^{(1)}) + v_x(I_x^{(0)} - I_x^{(1)}) + v_y(I_y^{(0)} - I_y^{(1)}) \quad [\text{Equation 28}]$$

In this case, $v_x$, $v_y$ may be determined by Equation 21 or 23. Although the weight w of generalized bi-prediction is taken into consideration in $P^{(0)}$ and $P^{(1)}$, the weight needs to be taken into consideration in the remaining terms. This is verified through a third embodiment below.

The present invention provides a BIO refinement method in which generalized bi-prediction is taken into consideration.

In a first embodiment, the encoder or the decoder may obtain $v_x$, $v_y$ using the above-described BIO method. For example, $v_x$, $v_y$ may be determined by Equations 21 or 23. A BIO predictor may be determined like Equation 29.

$$P = ((1-w) \cdot P^{(0)} + w \cdot P^{(1)}) + v_x((1-w) \cdot I_x^{(0)} - w \cdot I_x^{(1)}) + v_y((1-w) \cdot I_y^{(0)} - w \cdot I_y^{(1)}) \quad [\text{Equation 29}]$$

In this case, w may be determined as one of Equations 25 to 27.

In a second embodiment, the encoder or the decoder may determine a BID predictor as in Equation 30.

$$P = (P^{(0)} + P^{(1)}) + v_x((1-w) \cdot I_x^{(0)} - w \cdot I_x^{(1)}) + v_y((1-w) \cdot I_y^{(0)} - w \cdot I_y^{(1)}) \quad [\text{Equation 30}]$$

In this case, w may be determined as one of Equations 25 to 27.

In a third embodiment, BID can improve predictor without the transmission of additional information using an optical flow.

Assuming that an object moves at steady speed for a short time in addition to the condition of an optical flow (brightness constancy constraint (BCC)), when bi-directional reference pictures are present with reference to a current picture as in FIG. 7, motion vectors at a position A and a position B may be represented as the same symmetrical value. For example, an optical flow motion vector may be obtained from a current block and a reference block obtained by motion estimation.

Accordingly, a difference between pixel values at the position A and the position B may be arranged like Equation 31 according to the two assumptions.

$$\Delta[i,j] = (1-w) \cdot I^0[i+v_x, j+v_y] - w \cdot I^1[i-v_x, j-v_y] \quad [\text{Equation 31}]$$

In this case, I^0[i+v_x, j+v_y] is a pixel value of the reference picture 0 (Ref0) 720 at the position A, and I^1[i−v_x, j−v_y] is a pixel value of the reference picture 1 (Ref1) 730 at the position B. Furthermore, (i, j) means the coordinates of the current pixel 711 within the current picture 710, and w indicates a weight value.

Each pixel value may be represented like Equation 32 using the primary equation of Taylor series.

$$I^0[i+v_x, j+v_y] = I^0[i,j] + \frac{\partial I^0[i,j]}{\partial x} v_x + \frac{\partial I^0[i,j]}{\partial y} v_y \quad [\text{Equation 32}]$$

$$I^1[i-v_x, j-v_y] = I^1[i,j] - \frac{\partial I^1[i,j]}{\partial x} v_x - \frac{\partial I^1[i,j]}{\partial y} v_y$$

Equation 31 may be arranged like Equation 33 by substituting Equation 31 into Equation 32.

$$\Delta[i,j] = (1-w) \cdot I^{(0)}[i,j] - w \cdot I^{(1)}[i,j] + v_x[i,j]((1-w) \cdot I_x^{(0)}[i,j] + w \cdot I_x^{(1)}[i,j]) + v_y[i,j]((1-w) \cdot I_y^{(0)}[i,j] + w \cdot I_y^{(1)}[i,j]) \quad [\text{Equation 33}]$$

In this case, I_x^(0)[i,j] and I_y^(0)[i,j] are x-axis and y-axis derivative values at a first correspondence pixel position within the reference picture 0 (Ref0) 720. I_x^(1)[i,j] and I_y^(1)[i,j] are x-axis and y-axis derivative values at a second correspondence pixel position within the reference picture 1 (Ref1) 730 and mean the gradient (or grade, change) of a pixel at a [i,j] position.

Accordingly, a BIO gradient may be determined using Equation 34 and the interpolation filter of Table 1.

$$I_x^{(k)}[i,j] = \sum_{n=-M+1}^{M} dF_n(\alpha_x^{(k)}) R^{(k)}[i+n, j], k = 0 \text{ or } 1 \quad [\text{Equation 34}]$$

$$I_y^{(k)}[i,j] = \sum_{n=-M+1}^{M} dF_n(\alpha_y^{(k)}) R^{(k)}[i, j+n], k = 0 \text{ or } 1$$

In this case, 2*M means a filter tab number. $\alpha\_x\hat{}(k)$ means a fractional part of a motion vector in the x-axis direction. $dF\_n(\alpha\_x\hat{}(k))$ means an n-th filter tab coefficient in $\alpha\_x\hat{}(k)$. $R\hat{}(k)[i+n, j]$ means a reconstructed pixel value at [i+n, j] coordinates within a reference picture k (k is 0 or 1).

The present invention can find motion vectors $v_x[i,j]$, $v_y[i,j]$ a pixel unit that minimize $\Delta^2(i,j)$ using Equation 33.

Assuming that a locally steady motion is present within a window Ω with reference to the coordinates [i,j] of a current pixel, the position of a pixel in the window of a (2M+1)×(2M+1) size may be represented as [i',j'] In this case, [i', j'] satisfies i−M≤i'≤i+M, j−M≤j'≤j+M.

The terms of Equation 33 may be represented like Equation 35, for convenience of expressions.

$$G_x[i,j] = ((1-w) \cdot I_x^{(0)}[i,j] + w \cdot I_x^{(1)}[i,j]) \cdot 2$$

$$G_y[i,j] = ((1-w) \cdot I_y^{(0)}[i,j] + w \cdot I_y^{(1)}[i,j]) \cdot 2$$

$$\delta P[i,j] = ((1-w) \cdot P^{(0)}[i,j] - w \cdot P^{(1)}[i,j]) \cdot 2 = ((1-w) \cdot I^{(0)}[i,j] - w \cdot I^{(1)}[i,j]) \cdot 2 \quad [\text{Equation 35}]$$

In this case, G_x indicates the gradient an x-axis (i.e., horizontal direction), G_y indicates the gradient of a y-axis (i.e., vertical direction), and δP indicates the gradient of a t-axis (time axis) (or a change of a pixel value over time).

Furthermore, a set of the gradients of all coordinate values of a corresponding block is referred to as a gradient map.

In Equation 35, I means a pixel value obtained by motion estimation and is determined as P again.

Equation 35 leads to Equation 36 by substituting each term of Equation 33 into Equation 35 by taking a locally steady motion window into consideration.

$$\Delta^2(i,j) = (v_x \Sigma_\Omega G_x(i',j') + v_y \Sigma_\Omega G_y(i',j') + \Sigma_\Omega \delta P(i',j'))^2 \quad [\text{Equation 36}]$$

Furthermore, Equation 36 is arranged into Equation 37 by partially differentiating Equation 36 using V_x, V_y.

[Equation 37]

$$v_x \Sigma_\Omega G_x^2 + v_y \Sigma_\Omega G_x G_y + \Sigma_\Omega G_x \delta P = 0$$

$$v_x \Sigma_\Omega G_x G_y + v_y \Sigma_\Omega G_y^2 + \Sigma_\Omega G_y \delta P = 0 \quad (9)$$

Furthermore, when S1 to S6 are defined like Equation 38 in order to calculate V_x, V_y, Equation 37 may be expanded like Equation 39 and Equation 40.

[Equation 38]

$$s1 = \sum_\Omega G^2 x$$

$$s2 = s4 = \sum_\Omega G_x G_y$$

$$s3 = -\sum_\Omega G_x \delta P$$

$$s5 = \sum_\Omega G_y^2$$

$$s6 = -\sum_\Omega G_y \delta P$$

[Equation 39]

$$0 = \sum_{[i',j] \in \Omega} 2G_x(v_x G_x + v_y G_y + \delta P)$$

$$0 = \sum_{[i',j] \in \Omega} 2v_x G_x^2 + 2v_y G_x G_y + 2G_x \delta P$$

$$0 = 2v_x \sum_{[i',j] \in \Omega} G_x^2 + 2v_y \sum_{[i',j] \in \Omega} G_x G_y + 2 \sum_{[i',j] \in \Omega} G_x \delta P$$

$$0 = 2v_x s_1 + 2v_y s_2 - 2s_3$$

$$v_x = \frac{-v_y s_2 + s_3}{s_1}$$

[Equation 40]

$$0 = \sum_{[i',j] \in \Omega} 2G_y(v_x G_x + v_y G_y + \delta P)$$

$$0 = \sum_{[i',j] \in \Omega} (2v_x G_x G_y + 2v_y G_y^2 + 2G_y \delta P)$$

$$0 = 2v_x \sum_{[i',j] \in \Omega} G_x G_y + 2v_y \sum_{[i',j] \in \Omega} G_y^2 + 2 \sum_{[i',j] \in \Omega} G_y \delta P$$

$$0 = 2v_x s_4 + 2v_y s_5 - 2s_6$$

$$v_y = \frac{-v_x s_4 + s_6}{s_5}$$

As a result, if Equation 38 is used, V_x, V_y of Equation 37 may be arranged like Equation 41.

[Equation 41]

$$Vx = \frac{s3s5 - s2s6}{s1s5 - s2s4}$$

$$Vy = \frac{s1s6 - s3s4}{s1s5 - s2s4}$$

Accordingly, the predictor of a current pixel may be calculated like Equation 42 using V_x and V_y.

$$P = ((1+w) \cdot P^{(0)} + w \cdot P^{(1)}) + V_x((1-w) \cdot I_x^{(0)} - w \cdot I_x^{(1)}) + V_y((1-w) \cdot I_y^{(0)} - w \cdot I_y^{(1)}) \quad \text{[Equation 42]}$$

In this case, P indicates the predictor of the current pixel within the current block. P^(0) and P^(1) indicate the pixel values of (collocated) pixels (i.e., first correspondence pixel and second correspondence pixel) having the same coordinates as the current pixel in an L0 reference block and an L1 reference block.

The encoder or the decoder may require a heavy computational load when it calculates a motion vector of a pixel unit using Equation 41. Accordingly, in order to reduce computational complexity, Equation 41 may be approximated like Equation 43 and used.

[Equation 43]

$$Vx = \frac{s3}{s1}$$

$$Vy = \frac{s6 - Vx * s2}{s5}$$

In a fourth embodiment, a BIO predictor may be generalized like Equation 44 instead of Equation 42 in the third embodiment and used.

$$P = (\alpha_0 \cdot P^{(0)} + \alpha_1 \cdot P^{(1)}) + V_x(\beta_0 \cdot I_x^{(0)} - \beta_1 \cdot I_x^{(1)}) + V_y(\gamma_0 \cdot I_y^{(0)} - \gamma_1 \cdot I_y^{(1)}) \quad \text{[Equation 44]}$$

In this case, $\alpha_0$, $\alpha_1$ mean the weights of an L0 predictor and an L1 predictor, $\beta_0, \beta_1$ means the weights of an L0 x-direction gradient and L1 x-direction gradient, and $\gamma_0, \gamma_1$ mean the weights of an L0 y-direction gradient and L1 y-direction gradient.

For example, the weights of Equation 42 correspond to a case where weights have been determined like Equation 45.

$$\alpha_0 = \beta_0 \gamma_0 = 1-w$$

$$\alpha_1 \beta_1 = \gamma_1 = w \quad \text{[Equation 45]}$$

In an embodiment, the weight of Equation 44 may be determined through an optimization process. For example, if the weight is defined as in Equation 46, a BIO predictor may be determined like Equation 47.

$$\alpha_0 = 1-w$$

$$\beta_0 = \gamma_0 = 1$$

$$\alpha_1 = w$$

$$\beta_1 = \gamma_1 = 1 \quad \text{[Equation 46]}$$

$$P = ((1-w) \cdot P^{(0)} + w \cdot P^{(1)}) + V_x(I_x^{(0)} - I_x^{(1)}) + V_y(I_y^{(0)} - I_y^{(1)}) \quad \text{[Equation 47]}$$

For another example, if the weight is defined as in Equation 48, a BIO predictor may be determined like Equation 49.

$$\alpha_0 = 1$$

$$\beta_0 = \gamma_0 = 1-w$$

$$\alpha_1 = 1$$

$$\beta_1 = \gamma_1 = w \quad \text{[Equation 48]}$$

$$P = ((P^{(0)} + P^{(1)}) + V_x((1-w) \cdot I_x^{(0)} - w \cdot I_x^{(1)}) + V_y((1-w) \cdot I_y^{(0)} - w \cdot I_y^{(1)}) \quad \text{[Equation 49]}$$

Figure 11:
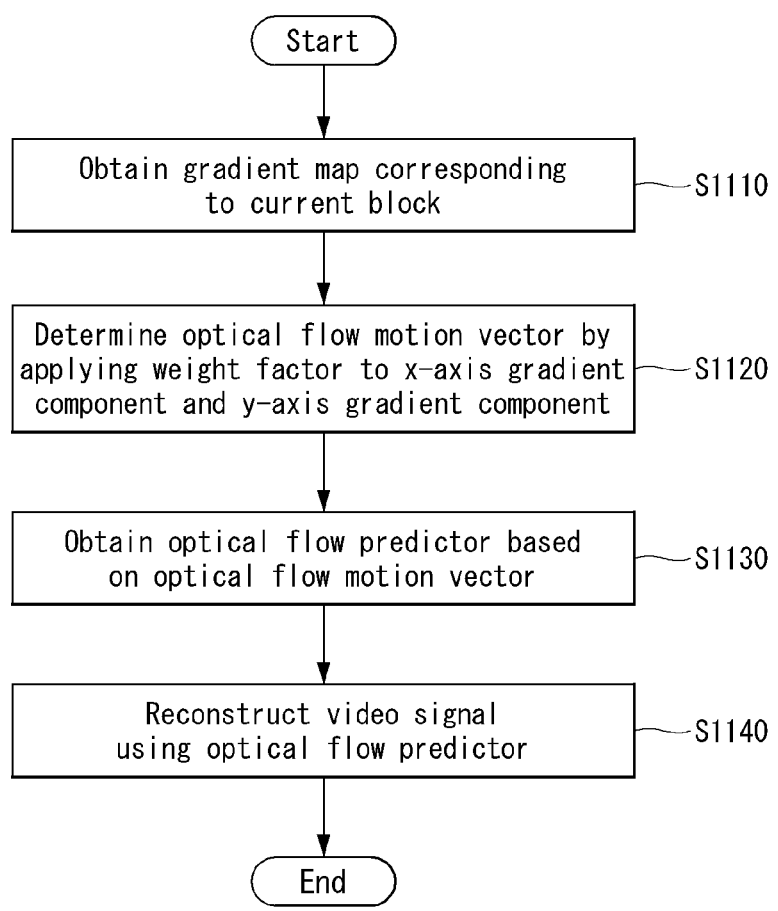
FIG. 11 is an embodiment to which the present invention is applied and is a flowchart for illustrating a method of performing bi-directional prediction by applying a weight to the gradient component of an optical flow predictor.

FIG. 11 is an embodiment to which the present invention is applied and is a flowchart for illustrating a method of performing bi-directional prediction by applying a weight to the gradient component of an optical flow predictor.

The encoder or the decoder may determine whether bi-directional prediction is performed on a current block. In this case, the bi-directional prediction means that it is performed using a first reference picture and a second reference picture in opposite directions on a time axis with reference to the current block, and has been referred to as true bi-prediction.

The encoder or the decoder may obtain a gradient map corresponding to the current block if bi-directional prediction is performed on the current block (S1110). In this case, the gradient map indicates a set of gradients at all pixel positions within a block having a size more extended than the current block. The gradient map may include at least one of an x-axis gradient component, a y-axis gradient component and a time-axis gradient component.

The encoder or the decoder may determine an optical flow motion vector by applying a weight factor to at least one of the x-axis gradient component, the y-axis gradient component or the time-axis gradient component (S1120). In this case, the weight factor may include at least one of an L0 predictor weight, an L1 predictor weight, an L0 x-axis gradient weight, an L1 x-axis gradient weight, an L0 y-axis gradient weight or an L1 y-axis gradient weight.

In an embodiment, the L0 predictor weight, the L0 x-axis gradient weight and the L0 y-axis gradient weight may be set as a first value. The L1 predictor weight, the L1 x-axis gradient weight and the L1 y-axis gradient weight may be set as a second value. In this case, the sum of the first value and the second value is 1.

In an embodiment, the step of determining the optical flow motion vector may be performed according to the following steps. For example, an x-axis optical flow motion vector or a y-axis optical flow motion vector may be obtained, and the x-axis optical flow motion vector or the y-axis optical flow motion vector may be compared with a preset threshold. Furthermore, the optical flow motion vector may be determined based on a result of the comparison.

As a detailed example, when the x-axis optical flow motion vector or the y-axis optical flow motion vector is greater than the preset threshold, the x-axis optical flow motion vector or the y-axis optical flow motion vector is determined as the preset threshold.

In contrast, when the x-axis optical flow motion vector or the y-axis optical flow motion vector is not greater than the preset threshold, the x-axis optical flow motion vector or the y-axis optical flow motion vector is determined as the obtained x-axis optical flow motion vector or y-axis optical flow motion vector.

Meanwhile, the encoder or the decoder may obtain an optical flow predictor based on the optical flow motion vector (S1130). In this case, the optical flow predictor is obtained based on a bi-directional predictor. The bi-directional predictor indicates a predictor generated from the first reference picture and the second reference picture based on the motion vector of the current block, and an L0 predictor weight and an L1 predictor weight may be applied to the bi-directional predictor.

The encoder or the decoder may reconstruct the video signal using the optical flow predictor (S1140).

As described above, the embodiments described in the present invention may be implemented on a processor, a microprocessor, a controller or a chip and performed. For example, the function units shown in FIGS. 1 and 2 may be implemented on a computer, a processor, a microprocessor, a controller or a chip and performed.

As described above, the decoder and the encoder to which the present invention is applied may be included in a multimedia broadcasting transmission/reception apparatus, a mobile communication terminal, a home cinema video apparatus, a digital cinema video apparatus, a surveillance camera, a video chatting apparatus, a real-time communication apparatus, such as video communication, a mobile streaming apparatus, a storage medium, a camcorder, a VoD service providing apparatus, an Internet streaming service providing apparatus, a three-dimensional 3D video apparatus, a teleconference video apparatus, and a medical video apparatus and may be used to code video signals and data signals.

Furthermore, the decoding/encoding method to which the present invention is applied may be produced in the form of a program that is to be executed by a computer and may be stored in a computer-readable recording medium. Multimedia data having a data structure according to the present invention may also be stored in computer-readable recording media. The computer-readable recording media include all types of storage devices in which data readable by a computer system is stored. The computer-readable recording media may include a BD, a USB, ROM, RAM, CD-ROM, a magnetic tape, a floppy disk, and an optical data storage device, for example. Furthermore, the computer-readable recording media includes media implemented in the form of carrier waves, e.g., transmission through the Internet. Furthermore, a bit stream generated by the encoding method may be stored in a computer-readable recording medium or may be transmitted over wired/wireless communication networks.

INDUSTRIAL APPLICABILITY

The exemplary embodiments of the present invention have been disclosed for illustrative purposes, and those skilled in the art may improve, change, replace, or add various other embodiments within the technical spirit and scope of the present invention disclosed in the attached claims.

The invention claimed is:

1. A method of decoding a video signal by an apparatus for decoding the video signal based on an optical flow motion vector, the method comprising:
   obtaining a gradient map corresponding to a current block when a bi-directional prediction is performed on the current block, wherein the gradient map includes a set of gradients at all pixel positions within a block having a size more extended than the current block and includes an x-axis gradient component and a y-axis gradient component;
   determining an optical flow motion vector by applying a weight factor to the x-axis gradient component and the y-axis gradient component;
   obtaining an optical flow predictor based on the optical flow motion vector; and
   reconstructing the video signal using the optical flow predictor,
   wherein the weight factor comprises at least one of an L0 predictor weight, an L1 predictor weight, an L0 x-axis gradient weight, an L1 x-axis gradient weight, an L0 y-axis gradient weight or an L1 y-axis gradient weight,
   wherein the L0 predictor weight, the L0 x-axis gradient weight and the L0 y-axis gradient weight are set equally as a first value,
   wherein the L1 predictor weight, the L1 x-axis gradient weight and the L1 y-axis gradient weight are set equally as a second value, and
   wherein a sum of the first value and the second value is 1.

2. The method of claim 1, further comprising:
   checking whether the bi-directional prediction is performed on the current block,
   wherein the bi-directional prediction is performed using a first reference picture and a second reference picture in opposite direction on a time axis with reference to the current block.

3. The method of claim 1,
   wherein the optical flow predictor is obtained based on the bi-directional predictor, and wherein the bi-directional predictor indicates a prediction value generated from a first reference picture and a second reference picture based on a motion vector of the current block, and an L0 predictor weight and an L1 predictor weight are applied to the bi-directional predictor.

4. A method of decoding a video signal by apparatus for decoding the video signal based on an optical flow motion vector, the method comprising:
  obtaining a gradient map corresponding to a current block when a bi-directional prediction is performed on the current block, wherein the gradient map includes a set of gradients at all pixel positions within a block having a size more extended than the current block and includes an x-axis gradient component and a y-axis gradient component;
  determining an optical flow motion vector by applying a weight factor to the x-axis gradient component and the y-axis gradient component;
  obtaining an optical flow predictor based on the optical flow motion vector; and
  reconstructing the video signal using the optical flow predictor,
  wherein determining the optical flow motion vector further comprises:
  obtaining an x-axis optical flow motion vector or a y-axis optical flow motion vector; and
  comparing the x-axis optical flow motion vector or the y-axis optical flow motion vector with a preset threshold,
  wherein the optical flow motion vector is determined based on a result of the comparison.

5. The method of claim 4,
  wherein when the x-axis optical flow motion vector or the y-axis optical flow motion vector is greater than the preset threshold, the x-axis optical flow motion vector or the y-axis optical flow motion vector is determined as the preset threshold.

6. The method of claim 4,
  wherein when the x-axis optical flow motion vector or the y-axis optical flow motion vector is not greater than the preset threshold, the x-axis optical flow motion vector or the y-axis optical flow motion vector is determined as the obtained x-axis optical flow motion vector or y-axis optical flow motion vector.

7. An apparatus for decoding a video signal based on an optical flow motion vector, the apparatus comprising:
  processor configured to obtain a gradient map corresponding to a current block when a bi-directional prediction is performed on the current block, determine an optical flow motion vector by applying a weight factor to the x-axis gradient component and the y-axis gradient component, and obtain an optical flow predictor based on the optical flow motion vector; and
  reconstruct the video signal using the optical flow predictor,
  wherein the gradient map includes a set of gradients at all pixel positions within a block having a size more extended than the current block and includes the x-axis gradient component and the y-axis gradient component,
  wherein the weight factor comprises at least one of an L0 predictor weight, an L1 predictor weight, an L0 x-axis gradient weight, an L1 x-axis gradient weight, an L0 y-axis gradient weight or an L1 y-axis gradient weight,
  wherein the L0 predictor weight, the L0 x-axis gradient weight and the L0 y-axis gradient weight are set equally as a first value,
  wherein the L1 predictor weight, the L1 x-axis gradient weight and the L1 y-axis gradient weight are set equally as a second value, and
  wherein a sum of the first value and the second value is 1.

8. The apparatus of claim 7,
  wherein the processor is configured to check whether the bi-directional prediction is performed on the current block, and
  wherein the bi-directional prediction is performed using a first reference picture and a second reference picture in opposite directions on a time axis with reference to the current block.

9. The apparatus of claim 7,
  wherein the optical flow predictor is obtained based on the bi-directional predictor, and
  wherein the bi-directional predictor indicates a prediction value generated from a first reference picture and a second reference picture based on a motion vector of the current block, and an L0 predictor weight and an L1 predictor weight are applied to the bi-directional predictor.

* * * * *